United States Patent

Reeder et al.

[11] Patent Number: 6,108,632
[45] Date of Patent: Aug. 22, 2000

[54] TRANSACTION SUPPORT APPARATUS

[75] Inventors: Anthony Andrew Reeder; Kim James Fisher; Michael Anthony Gell; Laurence Daniel Bradley, all of Ipswich, United Kingdom

[73] Assignee: British Telecommunications public limited company, London, United Kingdom

[21] Appl. No.: 09/029,770

[22] PCT Filed: Sep. 4, 1996

[86] PCT No.: PCT/GB96/02176

§ 371 Date: Apr. 3, 1998

§ 102(e) Date: Apr. 3, 1998

[87] PCT Pub. No.: WO97/11435

PCT Pub. Date: Mar. 27, 1997

[30] Foreign Application Priority Data

Sep. 4, 1995 [GB] United Kingdom ............... 95306156

[51] Int. Cl.⁷ .............................. G10L 15/22; H04M 3/50
[52] U.S. Cl. .......................... 704/275; 704/270; 705/37
[58] Field of Search ................... 704/275, 270; 705/1, 35, 37

[56] References Cited

U.S. PATENT DOCUMENTS

| 4,152,547 | 5/1979 | Theis .......................... 379/70 |
| 4,903,201 | 2/1990 | Wagner ....................... 705/37 |
| 4,980,826 | 12/1990 | Wagner ....................... 705/37 |
| 5,003,574 | 3/1991 | Denq et al. ................. 379/75 |
| 5,033,088 | 7/1991 | Shipman ..................... 704/275 |
| 5,335,276 | 8/1994 | Thompson et al. ........ 380/266 |
| 5,357,596 | 10/1994 | Takebayashi et al. ..... 704/275 |
| 5,414,444 | 5/1995 | Britz .......................... 345/156 |
| 5,491,507 | 2/1996 | Umezawa et al. ......... 348/14 |
| 5,794,207 | 8/1998 | Walker et al. ............. 705/1 |
| 5,924,082 | 7/1999 | Silverman et al. ........ 705/37 |

FOREIGN PATENT DOCUMENTS

| 0 041 902 | 12/1981 | European Pat. Off. ......... H04M 3/56 |
| 0 236 180 | 9/1987 | European Pat. Off. ......... H04M 1/72 |
| 0 295 837 | 12/1988 | European Pat. Off. ......... H04M 3/50 |
| 0 515 068 | 11/1992 | European Pat. Off. ......... H04M 3/46 |
| 0 535 903 | 4/1993 | European Pat. Off. ......... H04B 1/38 |
| 0 606 041 | 7/1994 | European Pat. Off. ......... H04M 3/42 |
| 6-141306 | 5/1994 | Japan ............................. H04N 7/14 |
| 2 257 602 | 1/1993 | United Kingdom .......... H04M 3/42 |
| 2 257 872 | 1/1993 | United Kingdom .......... H04M 3/42 |
| 2 282 506 | 4/1995 | United Kingdom .......... H04N 7/15 |
| WO 91/08572 | 6/1991 | WIPO ............................ G11C 7/00 |
| WO 92/05540 | 4/1992 | WIPO ............................ G10L 7/08 |
| WO 92/09166 | 5/1992 | WIPO ........................... H04M 11/10 |

OTHER PUBLICATIONS

D. A. Reynolds and L. P. Heck, "Integration of Speaker and Speech Recognition Systems," Proc. ICASSP 91, pp. 869–872, Apr. 1991.

Patent Abstract of Japan, vol. 16, No. 17 (P–1299) of Japanese Patent Appl. No. 03–235117, Jan. 16, 1992.

Patent Abstract of Japan, vol. 18, No. 214 (P–1727) of Japanese Patent Appl. No. 06–012220, Apr. 15, 1994.

Patent Abstract of Japan, vol. 18, No. 549 (E–1618) of Japanese Patent Appl. No. 06–197335, Oct. 19, 1994.

(List continued on next page.)

*Primary Examiner*—David R. Hudspeth
*Assistant Examiner*—Tālivaldis Ivars Šmits
*Attorney, Agent, or Firm*—Nixon & Vanderhye P.C.

[57] ABSTRACT

A transaction support apparatus is used by one or more human transaction operators, each provided with a telephone. It includes a speech recognition device having: a speech input coupled to receive a speech signal input to a telephone by a transactiob operator, a speech recognition processor arranged to recognize predetermined transaction parameters within the speech signal; and a parameter output at which the speech recognition device is arranged to make values of the parameters thus recognized available.

34 Claims, 15 Drawing Sheets

OTHER PUBLICATIONS

Patent Abstract of Japan, vol. 95, No. 1 of Japanese Patent Appl. No. 06–303604, Feb. 28, 1995.

Article entitled "The Back Office Revolution", Banking World, vol. 8, No. 5, May 1990, pp. 37–38.

Berkley, David A. et al., "Multimedia Research Platforms", AT&T Technical Journal, vol. 74, No. 5, Sep./Oct. 1995, pp. 34–44.

Ward, Adele, "Inside a Merchant Bank", Communicate, Jan. 1988, pp. 38–39.

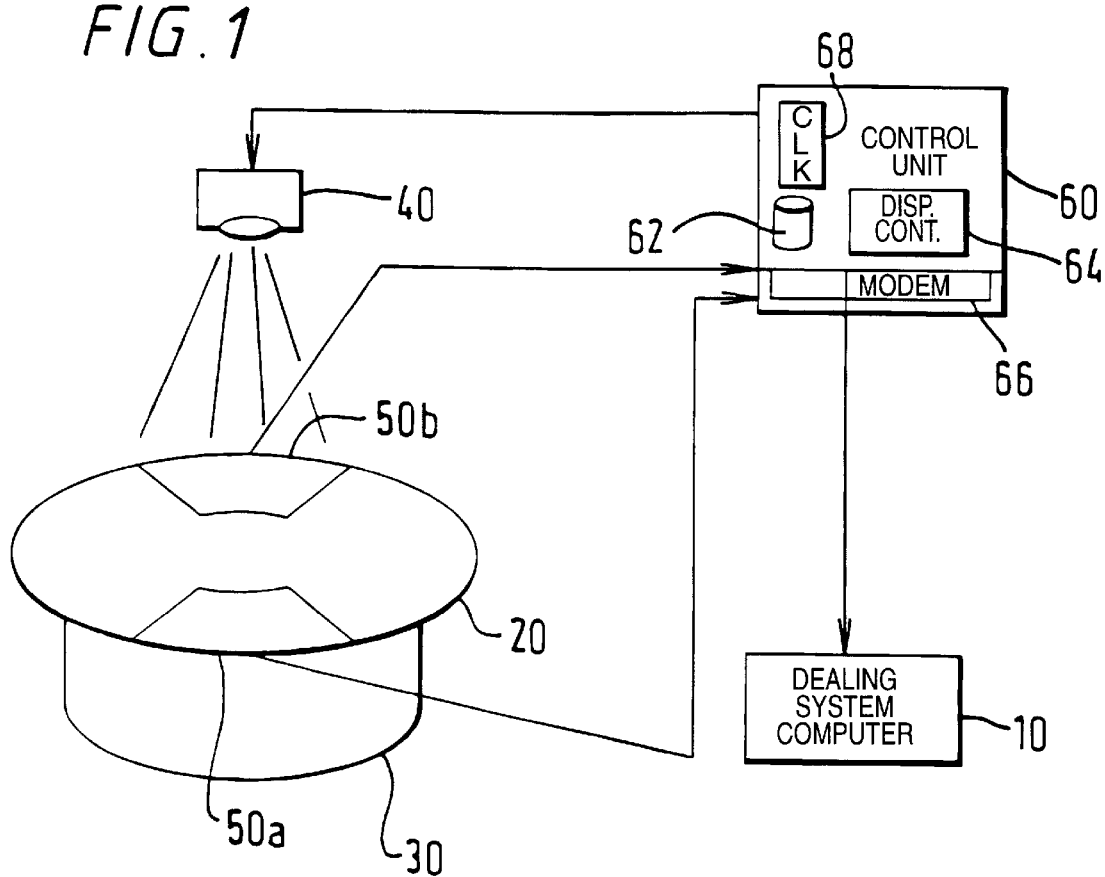
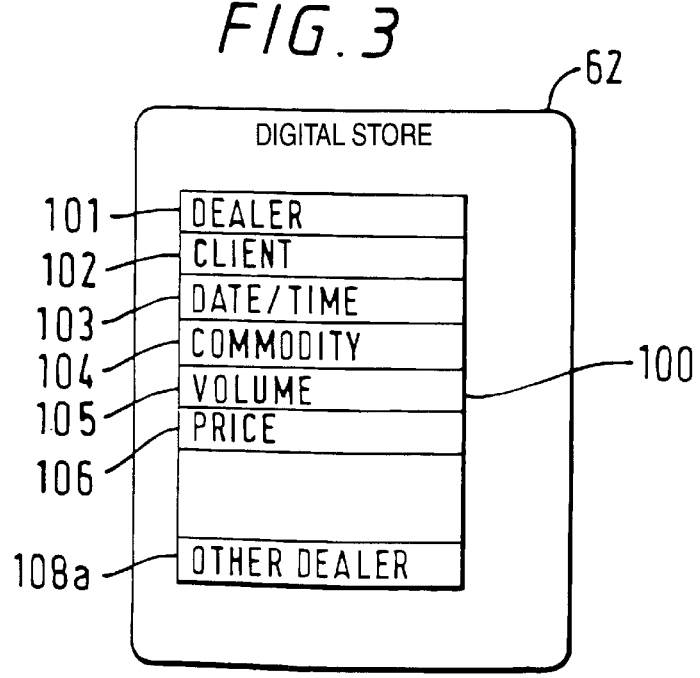

a) ———$5/82———→ INTENTION TO ACQUIRE b) ———$5/83———→ INTENTION TO DISPOSE c) - - - - - DOTTED OR FLASHING - - - - -→ DEAL SETUP IN PROGRESS d) ——————————→ NEW DEAL e) ═══════════▷ OLD DEAL LARGE f) ──────────→ OLD DEAL SMALL

TRANSACTION SUPPORT APPARATUS

BACKGROUND OF THE INVENTION

1. Field of the Invention

This invention relates to transaction support apparatus; particularly, but not exclusively, to apparatus for use in financial transactions.

2. Related Art

It is known to perform transactions in shares, currency or other financial commodities in a dealing room. A known dealing room consists of a number of human dealers located around a large circle. Each human dealer is typically equipped with a computer terminal, a telephone, a pair of indicator lights of different colours (one indicating a desire to sell and one indicating a desire to buy), and a number of cards with which to indicate the client party, or other information.

On receipt of an instruction to buy or sell a quantity of a particular commodity, the dealer concerned turns on the light to indicate the corresponding wish to buy or sell, and then starts to negotiate with other dealers by gestures, signals and speech. Often, to complete one transaction, the dealer may need to buy from or sell to a number of other dealers to make up a cumulative total.

When the deal is agreed, each dealer makes a note of the details of the deal on paper, and relays the details by telephone to his client. The details are collected later by a messenger and are input to dealing system which executes the transfers of the commodities between the clients.

The dealer's telephones may intermittently be monitored and recorded onto tape.

During busy periods, it becomes difficult to keep track of all deal details and to ensure that they are promptly input into the dealing computer whilst keeping up with the volume of transactions.

Various proposals have been made for automating transactions, so as to replace the human interaction with interaction via computer terminals.

SUMMARY OF THE INVENTION

In a first aspect, the present invention is however intended to provide apparatus to support transactions to be performed by human operators, so as to improve the efficiency of human to human communication whilst maintaining many aspects of their current way of working.

In a second aspect, the present invention is concerned with the provision of transaction support apparatus in which humans communicate via computer terminals, whilst retaining some elements of human-human interaction.

In one specific aspect, the invention aims to improve the reliability and efficiency with which deals are recorded. This is achieved by the provision of speech recognition apparatus adjacent each dealer, advantageously connected to his telephone. It is advantageous that the apparatus should also be capable of performing speaker or voice recognition, thus adding an extra element of security to the system. Advantageously, some means of confirming the details of the deal which has been recognised may be provided, and this may be in the form of a visual display, or in the form of a synthetic speech recital.

In another specific aspect, the invention aims to improve the reliability and efficiency with which deals are recorded by providing a digital speech recording unit to record the confirmatory telephone conversations from each dealer, and to supply the recorded digital telephone conversation files to a transcription terminal at which they may be replayed and the details extracted for data entry. Advantageously, this is combined with the first specific aspect of the invention and only those parts of calls for which speech recognition has not been completely successful are thus transcribed. Conveniently, where digital data on values of parameters of the call are already available (for example via speech recognition), such values are transmitted as a single file along with the recorded speech.

In known dealing rooms, it is possible for several deals to be conducted simultaneously. The efficiency of a market increases with the number of dealers, but the efficiency of human communication sets a limit on the size of the dealing room beyond which dealing is not reliably possible; this typically occurs at around 14–18 people.

In another aspect, the invention aims to facilitate human-human communication, and thus to increase the efficiency of a given size of group of dealers, or to increase the number of dealers within the dealing room. This is achieved, in one aspect, by a common display visible to all the dealers, which may conveniently be a single display surface such as a table top around which the dealers are located. It is thus possible to display graphical indicia of the deals and prospective deals which are in progress at any time, thus reducing verbal confusion and facilitating faster dealing.

In another aspect, the invention provides transaction support apparatus in which humans communicate via computer terminals which illustrate a display (preferably a common display as in the above embodiments) which is preferably represented as a three dimensional display, and advantageously also includes private display information which is not available to all human operators.

In a yet further embodiment, which may be independently useful separately of the above embodiments and for purposes other than transaction support, the invention provides a telephone handset for use in transaction support apparatus of the kind described above, which includes a display screen held in front of the face of the human operator. This enables the display of financial or other data whilst the operator utilises the telephone or conducts negotiations, thus accelerating the deal process.

Other aspects and preferred embodiments will be apparent hereafter from the following description and claims.

BRIEF DESCRIPTION OF THE DRAWINGS

The invention will now be illustrated, by way of example only, with reference to the accompanying drawings in which:

FIG. 1 illustrates transaction support apparatus according to a first embodiment to the invention;

FIG. 3 is an illustrative diagram indicating the contents of a record held within a memory forming part of FIGS. 1 and 2;

FIG. 3 is a perspective view of a handset forming part of a third embodiment of the invention in an open position;

DETAIL DESCRIPTION OF EXEMPLARY EMBODIMENTS

First Embodiment

Figure 2:
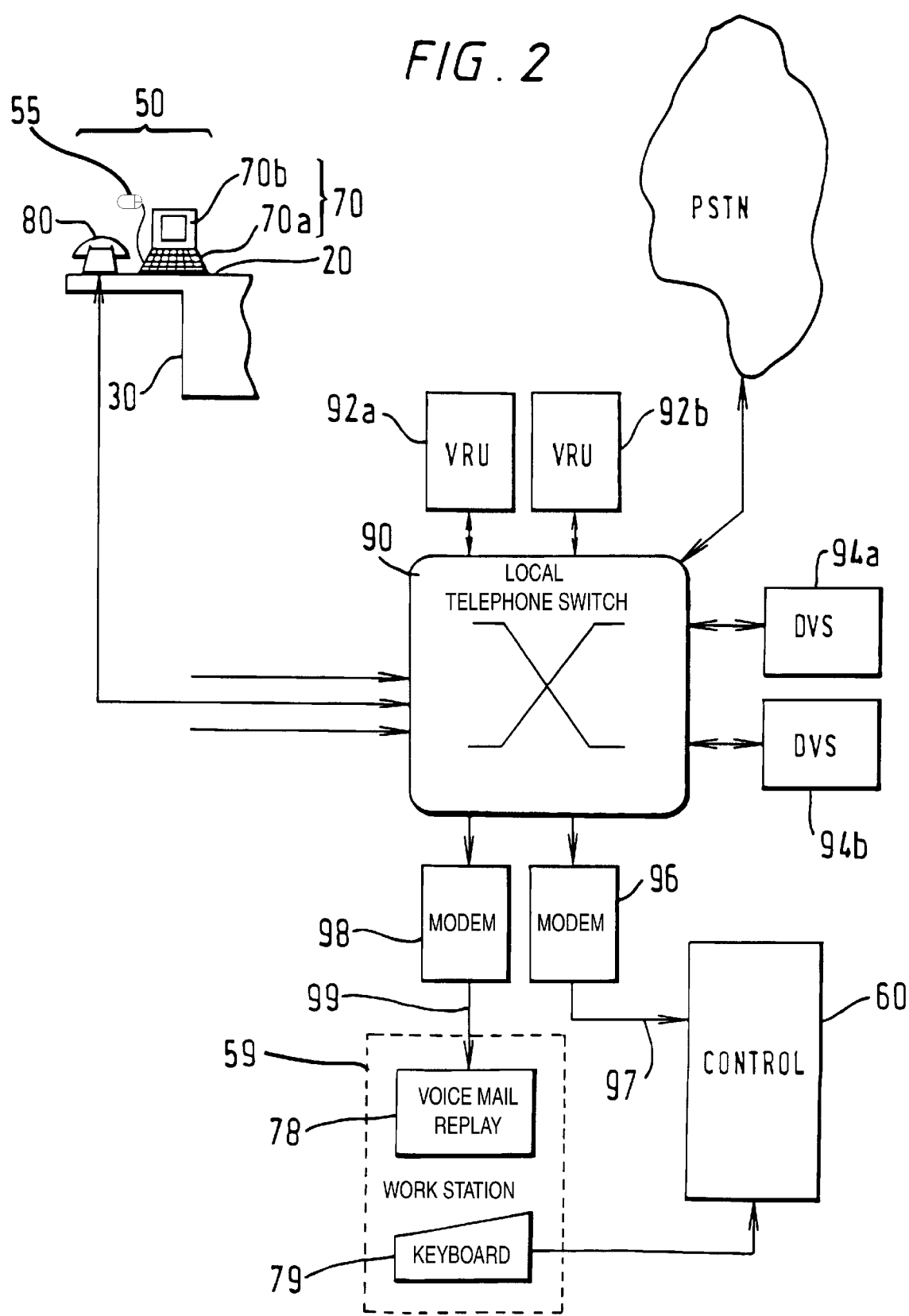
FIG. 2 is a block diagram showing in greater detail the elements of FIG. 1.

A first embodiment of the invention will now be disclosed.

The apparatus of the present invention is connected to a dealing system computer 10, which does not in this embodiment form part of the present invention. The operation of the dealing system computer 10 is conventional, and will not be described in detail; briefly, it comprises a store which stores records of each deal consisting at least of the identity of the buyer(s) and the seller(s), the agreed price(s), the quantity (or quantities), the instrument or commodity in Question, and the identity of the dealer(s). These details are then used to initiate payment through an automated system (such as, for share dealing, TAURUS).

The present embodiment comprises a display surface 20 provided as the top of a table structure 30; a projection apparatus 40 positioned to project an image onto the display surface 20; and a plurality of dealer stations 50a, 50b . . . (only 50a, and 50b being shown).

A control unit 60 (provided typically by a suitably programmed computer) is connected to each of the work stations 50a, 50b . . . and the projector 40.

Referring to FIG. 2, each dealer station 50 comprises a computer terminal 70 consisting of a keyboard 70a and display 70b (for example a conventional computer monitor) which are connected to the control unit 60. Also provided is a telephone 80.

Also comprised at each dealer station 50 is a painting device (i.e. a device permitting the operator to designate an object or area by pointing the device or some part of his body towards that object or area. The pointing device 55 may, for example, be a light pen as described in greater detail below. Each pointing device is connected to the control unit 60.

Each of the telephones 80a . . . 80n is connected to a local telephone switching centre 90 (for example a private branch exchange (PABX) located adjacent the dealing room).

Also connected to the local switching centre 90 are a plurality of voice recognition units 92a–92e, a plurality of digital voice storage units 94a–94e, a modem 96 connected to a signalling line 97 to the control unit 60, and a modem 98 connected via a signalling line 99 to a work station 95. The work station 95 comprises a voice mail replay facility 78 and a keyboard 79 connected to a permit data input into the control device 60.

In general, the control unit and local switching unit 90 are programmed to perform as follows.

Local Switching Centre

The local switching centre 90 is arranged to function as a conventional switching centre, routing calls to and from the telephones 80 of the individual dealers from particular clients, or other parties.

It is arranged also to perform calling party identification (using conventional caller line identification (CLI) techniques embodied in current telephones and switching centres), which is particularly straightforward where the lines from dealer to client are private circuits.

Additionally, the local switching centre 90 is arranged to connect a selected one of the speech recognition units 92 and digital voice store units 94 into selected calls, so as to be responsive to the microphone of the telephone 80 (and therefore to the telephone users voice).

Furthermore, the local switching centre 90 is arranged to selectively interconnect the output port of speech recognition unit 92 to the modem 96 to supply a digital message consisting of recognised work token signals via the line 97 to the control unit 60; and to connect the output of a digital voice store 94 to the modem 98 to supply a file of digitally recorded speech as a voice mail message to the voice mail unit 78.

Control Device

In the arrangement shown in FIGS. 1 and 2, the control device 60 comprises a digital storage device (e.g. a hard disk drive) 62, a display control device 64, a modem 66 for receiving digital data via the line 97 and modem 96 from the local switching unit 90 and a real time clock 68.

Referring to FIG. 3, the control unit 60 is arranged to create, in the digital store 62, a stored record 100 for each attempted transaction, the record 100 comprising the following information:

dealer name 101 client name 102 data and time of deal 103 commodity 104 volume 105 price 106

Also provided are one or more other party fields 108a . . . listing at least the identity of the other dealer (or, in the case where the deal involves several other dealers, each field 108 listing the identity of one of the other dealers) and, if available, data such as the identity of the other dealers client and so on. The other party fields 108 may each contain a pointer to a further deal record 100 which corresponds to the deal as perceived by the other party dealer.

The control unit 60 is arranged to perform the following general functions:

1. create a new deal record 100 within the store 62;
2. create new partial deal fields 108;
3. filling in data into each of the fields of the deal and partial deal records 100 with data received from:
   (a) the local exchange unit 90 (via the modem 96 and line 97)
   (b) the speech recognition units 92 (via the local exchange 90, modem 96 and line 97),
   (c) the keyboards 70a and 79
   (d) the pointing devices 55
4. display the information relating to each deal record 100 on the displays 20 and 70b, and maintain and update the displays as the contents of the deal record 100 change.
5. record the closure of a deal and transmit a deal record to the deal computer 10.

Digital Voice Store

The digital voice store units 94 each comprise a digital encoder and a digital storage device (e.g. a hard disk drive or a flash eprom). The coder may be a simple adaptive differential pulse code modulation (ADPCM) encoder, but is preferably a low bit rate encoder such as a linear predictive coding (LPC) or other parametric coder. The full rate or half rate coders describe fully in the specifications for the GSM digital cellular radio system may, for example, be employed. The output of the coder is digital data representing the telephone speech of the dealer, which is stored in the memory device, together with header data itemising the dealer, the calling party telephone number, the date and time, and any other known data (e.g. the identity of the other dealer in the transaction).

Speech Recognition Units

Each speech recognition unit comprises, in this embodiment, a hidden markov model (HMM) speech recogniser, as disclosed for example in "Hidden Markov Models for automatic speech recognition:theory and application"; S. J. Cox; British Telecom Technology Journal Vol. 6 No. 2, April 1988.

The recogniser typically comprises a preprocessor arranged to extract features (for example mel frequency capstral coefficients (MFCCs)) from the speech signal, and to calculate the likelihood the sequence of such features corresponding to a predetermined set of words, represented by store data modelling the words (for example, HMM states and transition probabilities).

The stored data corresponds to a limited set of words, which specifically represent predetermined prices, amounts, commodities or instruments and transaction types (for example, digits and multiples such as hundreds or thousands; currencies such as pounds, marks or dollars; instruments such a currencies, stocks or bonds; and transactions such as buy, sell, swap and so on).

In this embodiment, stored models are derived from instances of the word spoken by each of the dealers, so that the speech recognition units function as speaker dependent speech recognition units. Each speech recognition unit therefore stores a set of templates (i.e. stored data representing a model of each word) for each of the dealers, and uses tie set of templates associated with the dealer with whose telephone 80 the speech recognition unit is connected by the local switching centre 90.

Where the speech recognition units are speaker dependent recognition units, and additional advantage is obtained in that, as well as identifying words within the stream of speech, the speech recognition is able to give some measure of the closeness of the words recognised and the stored templates for the dealer who should be using the telephone concerned. This can be taken as an indication of how likely the speaker is to be the correct dealer.

Where a word is recognised with a degree of probability above a predetermined threshold level, the speech recognition unit outputs a token signal comprising, for example, the ASCII text stream representing the recognised word (i.e. "mark", "1000" and so on). Thus, a set of token signal representing the information recognised in the dealers speech over the telephone 80.

Each speech recognition unit is operable to transmit the token signals, together with header information indicating the telephone 80 from which the call was received (and hence the dealer ID), the telephone number with which the telephone was connected (and hence the identity of the client), the date and the time, via the modem 96 and line 97 to the control device 60, which is operable to demodulate the data and operate the corresponding the fields within the deal record 100.

In this embodiment, the control device 60 is operable to generate a confirmatory display on the monitor 70b for the dealer whose speech has been recognised, comprising the token data corresponding to what the speech recognition unit has recognised. The display indicates fields 102–106 for which data has not been recognised by a substitution of characters (for example asterisks), and may also indicate data for which the speech recognition unit established a relatively low level of recognition probability (and the validity of which is therefore uncertain) in italics or in some other special manner, so to draw the attention of the dealer to missing, suspect or incomplete data. The control device is then operable for a predetermined period of time (for example a minute) to permit the dealer to amend or enter data displayed on the monitor 7b via the keyboard 70a; thus, the dealer can correct misrecognised data immediately.

In an alternative embodiment, each speaker recognition unit 92 further comprises a speech synthesizer, and after termination of the call, the speech recognition unit 92 seizes the line to the dealers phone 80 and generates a synthesized voice signal through the load speaker thereof, to recite the recognised data and allow the dealer of a further opportunity of re-entering the data verbally via the telephone 80 for re-recognition. Alternatively, only words the recognition of which is dubious may be offered for re-recognition, as disclosed in our earlier application GB-A-2192746. The speech synthesizer may comprise a commercially available allophone synthesizer, supplied for example by Texas Instruments of Bedford, United Kingdom.

Display

The operation of the display formatter 64 and display generator 40 will now be discussed in general terms.

The display generator 40 may comprise a known video generator comprising, for example, three scanning light beam generators each arranged to generate one of three primary colours, red, green and blue, to create a raster scan across the display surface 20. The display formatter 64 is arranged to generate the graphics to be displayed on the display surface 2C.

Figure 4:
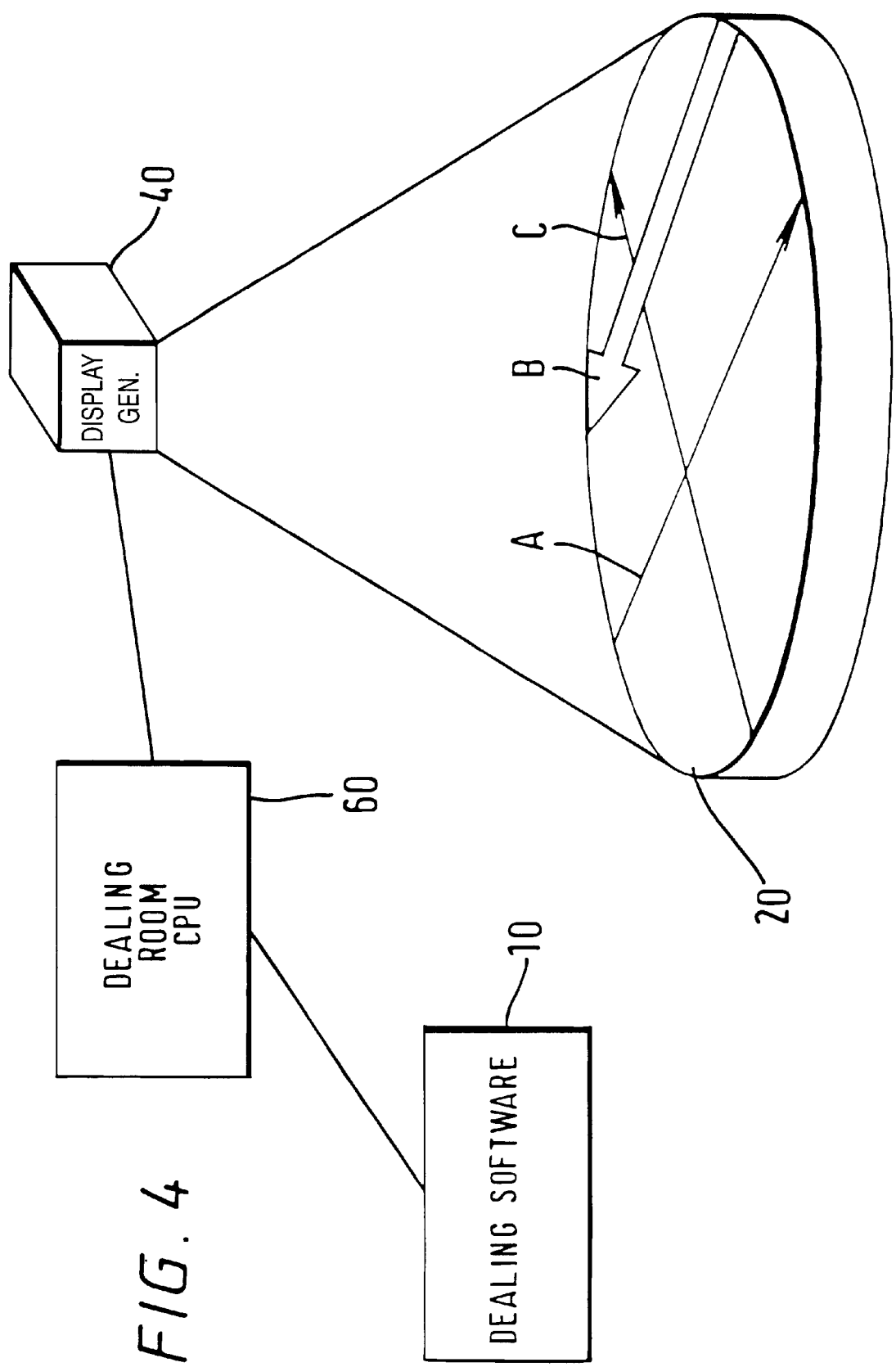
FIG. 4 shows in greater detail part of FIG. 1 and indicates the display produced thereby.

Referring to FIG. 4, a first graphic displayed on the display surface 20 comprises three deal indicator lines A–C, each of which here is represented as an arrow linking the work positions 50a, 50b of the two parties to the deal.

Figures 5, 6:
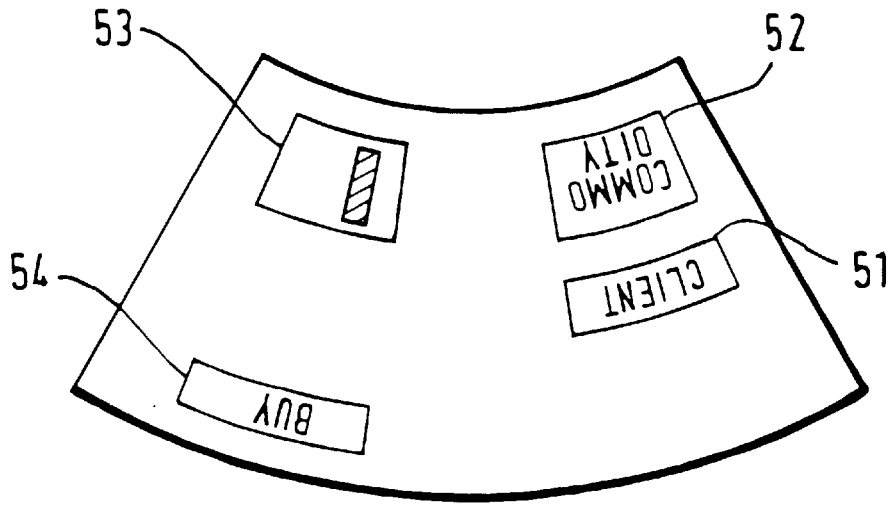
FIG. 5 illustrates particular displays to be displayed in the embodiment of FIG. 4.
FIG. 6 is a plan view showing in greater detail a portion of the display of FIG. 1.

Referring to FIG. 5, in FIG. 5a, an 'invitation to trade' graphic is shown. When a dealer at, for example, position 50a has received an instruction from a client to buy (e.g. $5 million at $1.682 per pound), on opening the deal table 100 the control unit 60 causes the display of a graphic comprising an arrow between the dealer station 50a and the centre of the display, and indicates such other information as may be available in table 100.

Where another dealer has an instruction from a client to perform a complimentary transaction (e.g., in this case, to sell dollars, for example $5 million at $1.683 to the pound), on creation of deal table 100, the control unit 60 is arranged to display a corresponding graphic between the second dealer position 50b and the centre of the display. In each case, the direction of the arrow indicates whether the dealer wishes to buy (e.g. acquire a particular commodity) or sell (e.g. dispose of a particular commodity); it will be recognised that in currency transactions, strictly, each transaction is a swap rather than a purchase.

A first deal representation graphic (FIG. 5c) shows a tentative deal in progress, when communication has been established between the two dealers but before the deal is finalised. The two intention to trade graphics running from the dealers 50a, 50b to the centre of the table are replaced by a connecting line graphic running between the two dealers 50a, 50b. The tentative nature of the deal is indicated by rendering the line discontinuous in space or time (i.e. either dotted/dashed or flashing respectively).

FIG. 5d shows the corresponding graphic displayed when the deal is finalised; it consists or a fully dark (or fully bright) solid arrow running across the display surface 20 between the stations 50 of the two dealers.

Preferably, some persistence may be provided; in other words, deals may continue to be displayed for a time after completion, but with diminishing intensity relative to the background of the display surface. The time over which deals remain visible is such that the number of deals simultaneously visible does not confuse the display.

As shown in FIGS. 5e and 5f, the width of the connector may be used to represent the value of the deal, this being obtained by the control unit 60 from the volume and price fields 105, 106 for the deal record 100 in question. FIG. 5e indicates a high value previous deal, whereas FIG. 5f represents a low value previous deal. Alternatively, rather than width, some other visual parameter (for example brightness or colour) could be used.

Thus, immediate visual feedback is available to all dealers as to the deals currently in progress, and as to the existence and value of previous deals.

Referring to FIG. 6, other data relating to the deal is preferably displayed graphically (and/or textually) in the display area 50 immediately adjacent each dealer; for example, a first display field 51 displays the name of the client; a second display field 52 displays the nature of the commodity; a third display field 53 indicates the amount; and a fourth display field 54 indicates whether the commodity is to be bought or sold, or in general the type of transaction (buy, sell, swap etc) envisaged.

Thus, every other dealer has an immediately available display of the available data on the deal.

The same data is preferably also displayed on the terminals 70b of each dealer.

In each case, the data displayed is derived directly from the fields of the deal record 100.

The control unit 60 may, in this embodiment, be arranged to create tentative deal records 108 itself, using simple price matching rules. For example, to establish a tentative currency deal, the control unit 60 determines whether two dealers wish to deal in the same currency; and, if so, whether their wishes are complimentary (i.e. one wishes to acquire and the other to dispose); and, if so, whether the two prices (if known) are within a predetermined range which indicates that compromise may be possible (for example within 0.1%, 1%, or 5%).

Pointing Devices

The pointing devices 55 may be active or passive designators. One passive optical designator consists of a photoelectric cell and suitable lenses to produce a narrowly directional beam to the cell. When the pointing device is pointed at the display area 50 immediately in front of a target dealer and a button is pressed, a pulse is produced in the photoelectric cell output at the moment when the raster beam produced by the display generator 40 passes the field of view of the pointing device. The control unit 60 is operable to compare the time of the pulse with the time base of the display generator 40, to determine the point on the display surface 20 at which the pointing device was pointed when the button thereon was pressed.

Equally, an active designator could be employed which generates a directed light or other radiation beam; in this case, a suitable detecting means (for example a wide area photoelectric sensor) may be provided at the target dealer. The signals transmitted by different active pointing devices are distinguishable (for example by time division multiple access techniques in which each pointing device transmits at a different time and the control unit 60 is arranged to determine the identity of the point device from the timing of the impulse detected by the photoelectric sensor).

Alternatively, a unique bar code may be present at each dealer display area 50, and each designator may be a bar code reader.

Method or Operation

Referring to FIG. 7, one exemplary method of operation of the above described embodiment will now be described in greater detail.

Figure 7A:
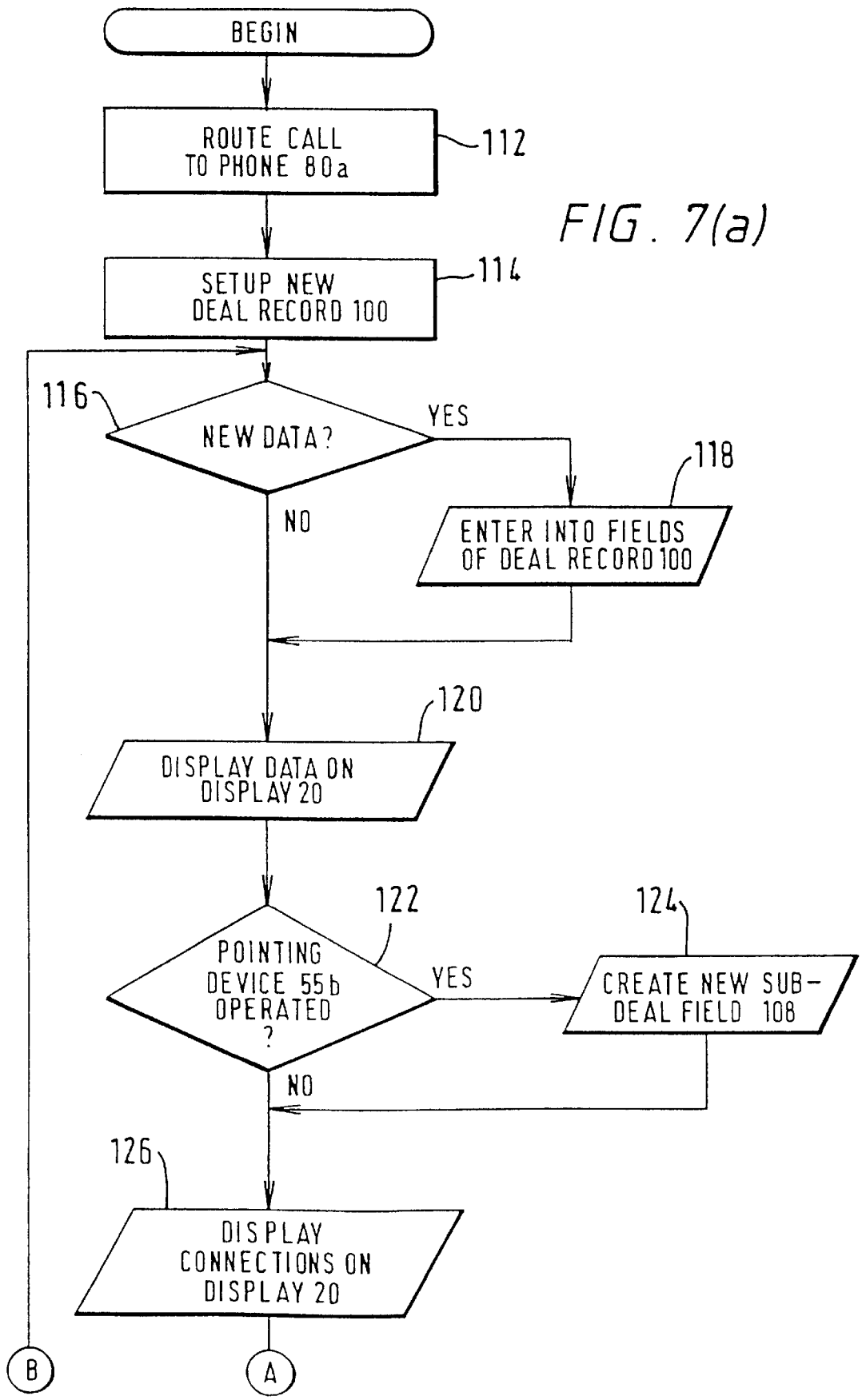
FIGS. 7a to 7c provide a flow diagram illustrating one exemplary mode of operation of the apparatus of FIG. 1.
Figure 7B:
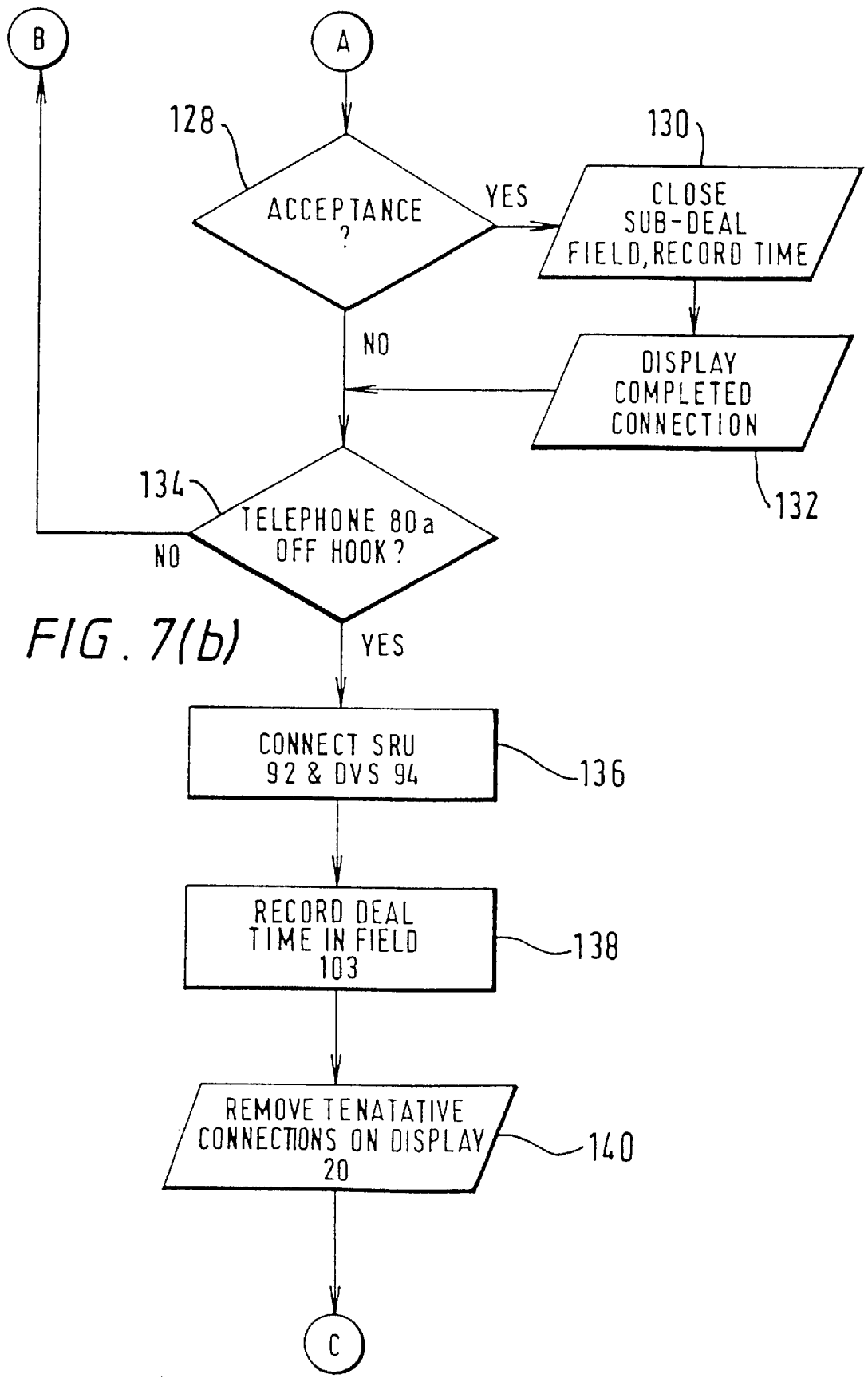
Figure 7C:
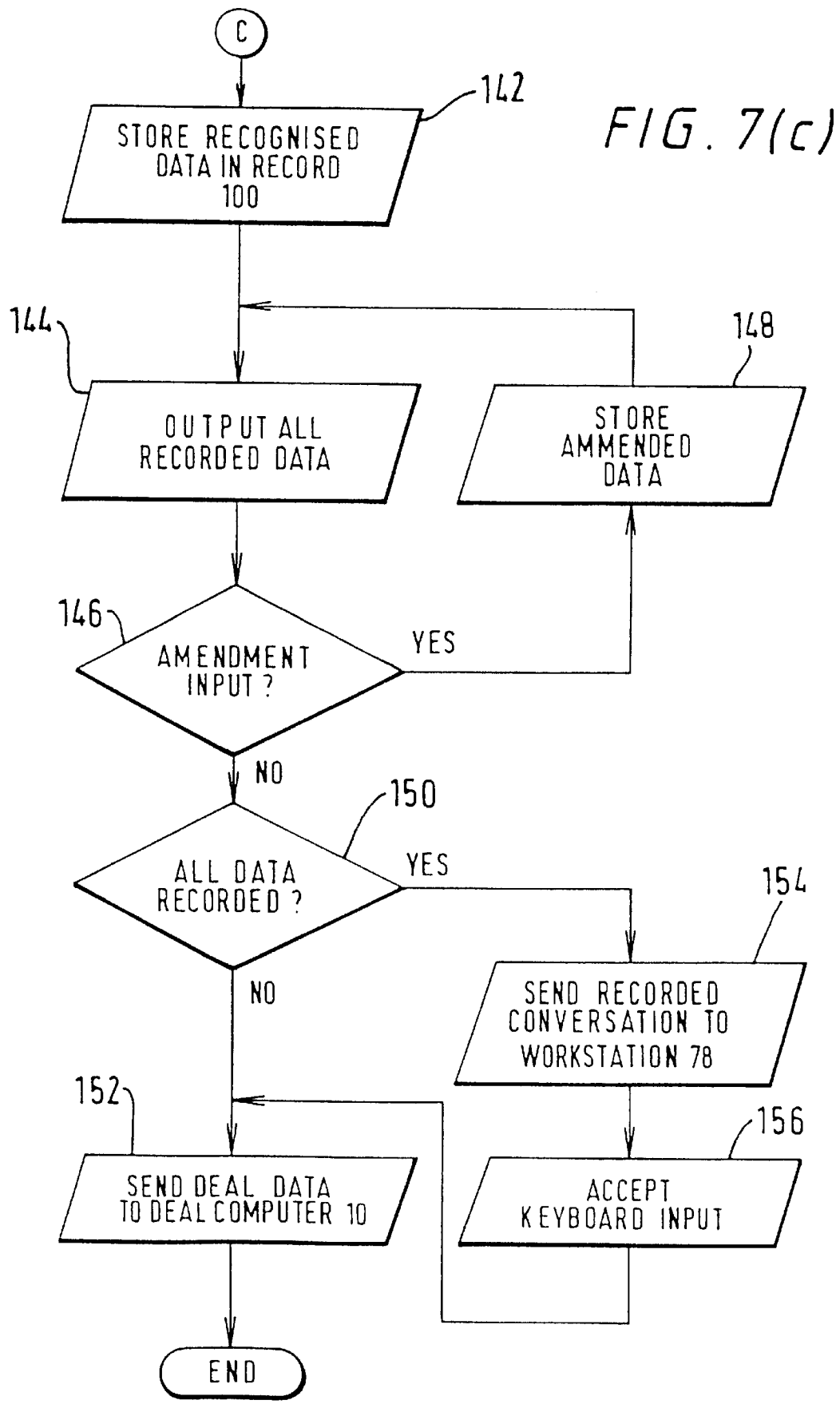

FIGS. 7a–7c provide an illustrative flowchart of the process performed by the apparatus of this embodiment. In a step 112, a call is received from a client at the local switching centre 90, and is routed to a dealer telephone 80.

The local switching centre 90 transmits to the control device 60 the calling line identification number, which is compared at the control device 60 with the numbers of known clients, and where there is a correspondence with a client, the control device 60 sets up, in a step 114, a new deal record 100, comprising the dealer identification field 101 (signalled to the control device 60 by the local switching centre 90 by reference to the telephone 80 to which the call was routed); and client identification field 102 (derived from the calling line ID).

At the same time, the local switching centre 90 is also arranged to detect any data signalled from the client via the telephone line (for example in the form of modulated tones, or out of band signalling) indicating, for example, the type of commodity or transaction sought, and to signal any such data to the control device 60 which is arranged to populate other fields of the deal record 100 with any such information which may be available.

Likewise, at any point after the opening of a new deal record 100, the control device 60 is arranged to generate a display on the dealer's display 70b and to accept input (step 116) from the dealer's keyboard 70a of data in displayed fields for commodity, price, or other deal information (step 120); and to store such input information in respective fields of the deal record 100 (step 118).

The control unit 60 is further arranged to display such information as is held in the deal record 100 in the fields 51–54 of the dealer station 50, so as to make information concerning the tentative deal available to the other dealers around the table. The same information in textual form may also be displayed on the monitors 70b of each dealer.

At this time, the other dealers will consider their positions and any dealer wishing to participate in the tentative deal points at the first dealer station 50a with his pointing device 55b. The identity of the pointing device 55b and of the dealer area 50a at which it pointed are read by the control device 60 (step 122). Accordingly, the control device 60 accesses the deal record 100 corresponding to the pointed at dealer area 50a, and creates a tentative sub-deal field 108a in which is recorded the identity of the dealer operating the pointing device 55b, in a step 124.

Next, the control device 60 causes the display on the display surface 20 of a dashed arrow, as shown in FIG. 5a, from the dealer area 50b of the dealer operating the pointing device 55b to the dealer area 50a pointed to by the pointing device 55b, in a step 126 (in which all other existing connection graphics are also re-displayed).

When the dealer with whom the deal record 100 is associated has decided to close a deal with one of the other dealers for whom tentative sub deal fields 108 exist, he points his pointing device 55a at the dealer station 50b of the corresponding other dealer and presses the button. When this is detected (in step 128), the control device 60 is operable to record the time from its real time clock 68 into the sub deal record 108 and close the sub deal record (step 130). This does not necessarily close the deal, because the deal may be comprised of several such sub deals. Accordingly, at this time, the deal record 100 is kept open.

At this time, in a step 122, the control device 60 is operable to modify the connection graphic (the dashed arrow) indicating a tentative deal to a solid arrow indicating a completed sub deal in a step 132.

Once the whole deal is done, the dealer calls his client on his telephone 80a. The local switching centre 90 signals the off hook status of the telephone and the called number to the control device 60. On detecting that the telephone corresponding to the dealer ID field 101 has dialled the telephone number corresponding to the client ID field 102, in a step 134, the control device 60 instructs the local switching centre 90 to connect to the call a speech recognition unit 92a and a digital voice store 94a in a step 136, and records the time from the real time clock 68 in the time field 103 in a step 128. In a step 130, any tentative deal connections displayed on the display 20, acceptance of which has not been indicated in a step 128 are erased from the display surface 20 and the corresponding sub deal records 108 are closed, with a flag indicating that they were not accepted.

Any parameter data recognised by the speech recognition unit is stored in the corresponding fields of the deal record 100 in a step 142 when the call is completed. In a step 144, all the data held in the deal record is displayed on the dealer's monitor 70b (or otherwise output for confirmation of its correctness). In a step 146, any amendments input via the dealer's keyboard 70a (or telephone 80) are accepted and stored in the deal table 100 in a step 148. In a step 150, the control device 60 tests whether all the necessary fields of the deal table 100 are populated and, if they are, in a step 152 the whole deal table is transmitted as a digital data file to the deal computer 10.

If some parameter fields in the deal record 100 are empty, in a step 154, the recorded speech file stored by the digital voice store 94 is transmitted to the voice message receiving station 78, together with a header associating the telephone conversation with the deal record 100. In a step 146, when the voice message workstation 78 is manned, the workstation 78 is operable to replay the recorded telephone conversation and, at the same time, the control device 60 reopens the deal record 100 associated with the telephone conversation, and accepts keyboard input from the voice message workstation 78 to complete the missing parameter data into the fields of the deal record 100 in accordance with the replayed telephone message as interpreted by the human operator of the workstation 78. The control unit 60 then reverts to step 152 to transmit the deal table 100 to the deal computer 10.

It will, of course, be clear that whilst the above description illustrates the operation of the apparatus of this embodiment in processing a single deal, multiple such deals may be occurring simultaneously, and accordingly the control device 60 and local switching centre 90 are operable to process multiple such deals, each with a separate deal table, simultaneously.

Alternative Embodiments

It will be clear from the foregoing embodiment that various minor modifications may be made to the apparatus and method described therein.

For example, in the above described embodiment, the speech recognition units and digital voice stores are described as a plurality of separate devices connected to the local switching centre. Whilst this is advantageous in some embodiments in that a smaller number of such devices may be provided than the number of telephones (since not all telephones will be simultaneously in operation), it will be apparent that a digital voice store and/or a speech recognition unit could be provided at each dealer telephone, and this alternative would render it possible to reduce the storage required for each speech recognition unit since it would only need to store the templates corresponding to words as spoken by a single speaker (the dealer whose telephone it is).

Equally, the speech recognition and/or digital voice store units could be provided at a physically separate location, or even at an exchange of the PSTN or another network to which the local switching centre is connected. This alternative provides the advantage that a large number of dealing rooms may share a smaller number of speech recognition and/or digital voice storage apparatus. On the other hand, it is inherently less secure since the telephone conversations pass outside of the dealing room and the circuit to the customer.

Whilst pointing devices in the form of light wands have been described, it would equally be possible to use more conventional pointing devices such as a mouse or trackball (conveniently provided as an input to the dealer's terminal 70). In this case, a cursor representing the position of the mouse or track ball is preferably displayed on the display surface 20 by the control device 60, to be controlled by the dealer. Alternatively, means such as head position or eye direction defectors could be employed, thus avoiding the need for physical manipulation of a pointing device by the dealer.

Whilst one example of a projection screen is described above, it will equally be apparent that a different type of projector could be used (for example a deformable mirror device (DMD) projector as described in, for instance, U.S. Pat. No. 5,424,868 could be used)

It may be convenient to make the display surface 20 translucent, and to illuminate it from below, from within the support structure 30; this has the advantage of making it possible to reduce the heat liberated in the dealing room by projected light beams, which may be contained within the support structure 30 beneath the display surface 20. The display surface 20 could be a phosphor screen in the manner of a cathode ray tube, illuminated by a cathode ray gun from below rather than by a light beam. Rather than using raster scanning, a stroke writing or vector display could be used. Equally, the display surface 20 itself could comprise an active display such as a liquid crystal display.

Rather than transmitting the digitally recorded speech as a separate file to a voice messaging work station 78, it would be possible to route the digitally recorded speech from the digital voice store 94 and the recognised data from the speech recognition unit 92, together with the data already held in the table 100, to a single digital file capable of representing both alphanumeric data and recorded audio data in a multi media format, and then the multi media format file may be forwarded to the deal computer 10; subsequently, the missing entries may be filled in on the deal computer 10 by replaying the recorded audio rather than correcting them on the control device 60 before forwarding them to the deal computer 10.

The speech recognition and digital voice storage devices 92, 94 could be provided with separate microphones positioned adjacent the dealer's telephone, to receive the same audio signal from the dealer as the telephone, rather than receiving the electric signal from the telephone itself; in practice, however, it is more convenient to utilise the telephone itself as the microphone since this will be positioned close to the dealer's mouth.

It will readily be recognised that the local switching centre and control device could be combined into a single programmed switching device. Likewise, either or both devices could in practice be combined with the deal computer 10 itself. The local switching device need not be a PABX, but could be provided by a local area network for example, or by an exchange forming part of a larger telephone network (e.g. the PSTN) suitably programmed to respond to the telephones 80 of the dealers.

Second Embodiment

A second embodiment of the invention will now be disclosed.

Figure 8:
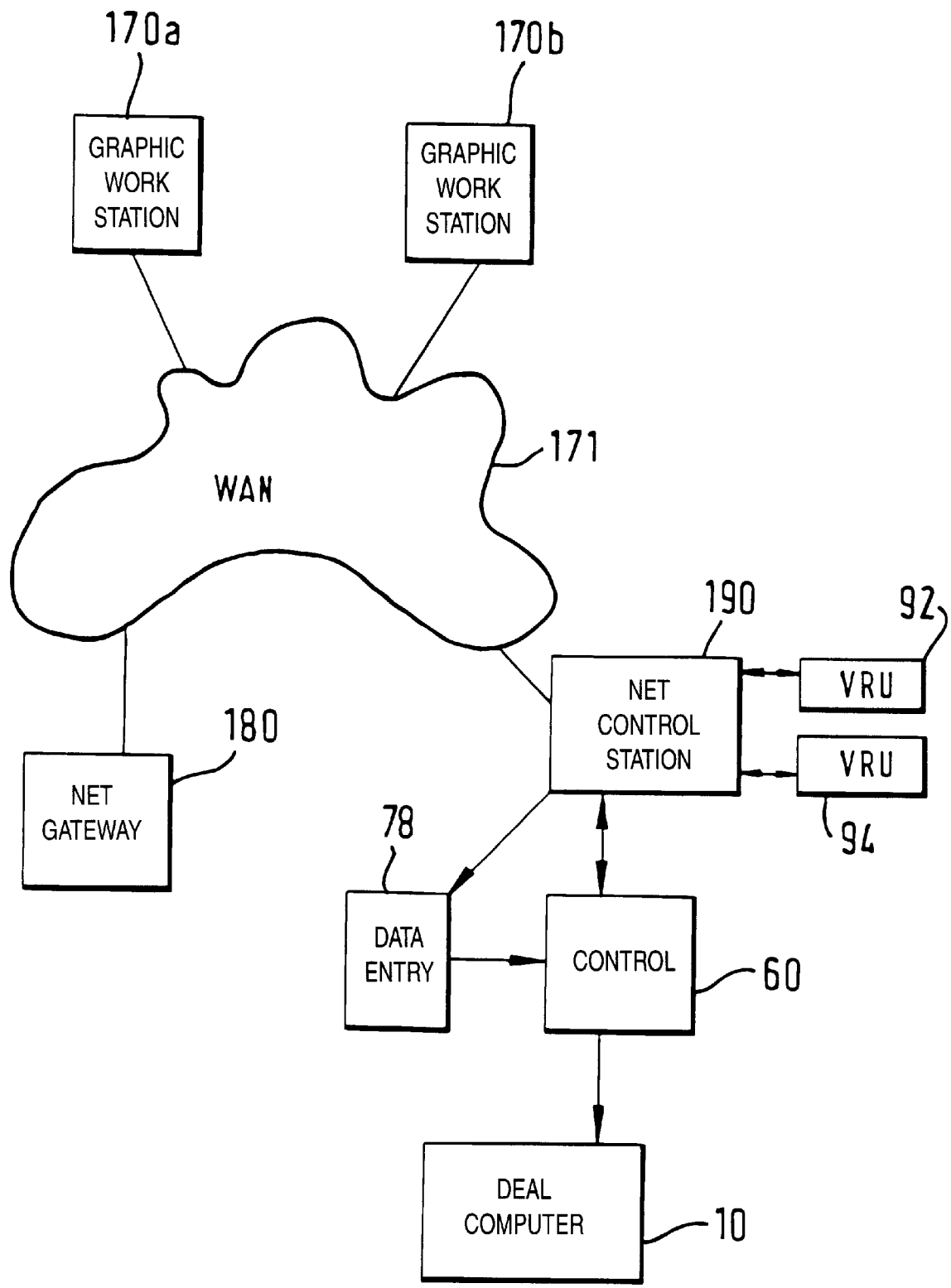
FIG. 8 is a block diagram illustrating the elements of a second embodiment of the invention.

In this embodiment, the operation of the control device 60 and the local switching centre 90 are substantially as described above, but the display surface 20, display projector 40 and dealer terminal 70 are supplemented or replaced by a dealer graphics workstation 170, shown in FIG. 8. The graphics workstation 170 is arranged to display connection graphics corresponding to those displayed on the common display surface 20 of the first embodiment, so that one or more dealers do not actually need to be in the dealing room; the second embodiment is thus operable with the first embodiment to provide access to the dealing room from dealers located elsewhere, or is operable to replace the common display surface 20 by physically separating all of the dealers and providing each with a graphics work station displaying a common connectivity graphic display.

FIG. 8 shows a plurality of dealer graphic work stations 170a, 170b . . . connected via a communications link 171 (which may be a wide area network, for example) with a network control station 190 (which may be a WAN network controller). At the network control station 190 are located the speech recognition and voice recording units 92, 94 disclosed in the above embodiment. The control station 190 is connected with the control device 60 and data entry terminal 78, and the control device 60 is connected to the deal computer 10. The network 171 is also connected to a gateway 180 to a financial information provider (such as Reuters or Knight-Ridder).

Figure 9:
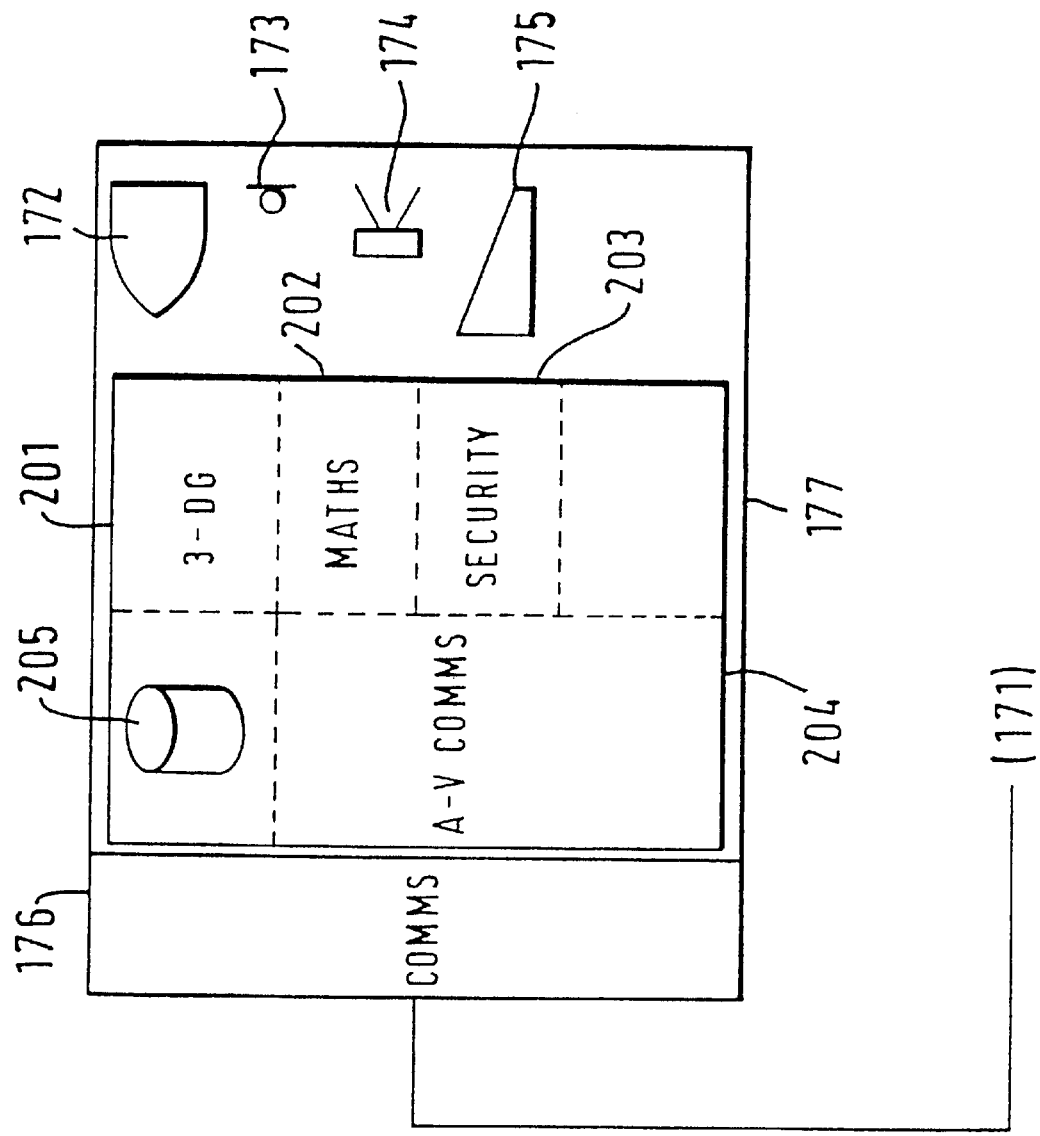
FIG. 9 is a block diagram showing in greater detail the components of a workstation forming part of the embodiment of FIG. 8.

Referring to FIG. 9, each graphic terminal 170 comprises a visual display unit 172, a microphone 173, a loud speaker 174, an input device 175 (comprising a keyboard 175a and a mouse or other cursor control device 175b, both of which are indicated by the common numeral 175 in FIG. 9); a communications interface 176 connected to the wide area network 171; and a processor section 177 comprising, functionally, the following elements:

a three dimensional graphics generator 201;
a mathematics and statistics processor 202;
a security function 203;
an audio visual communication module 204.

The processor section 177 is constructed of known processing elements; typically, a microprocessor and associated read only memory, random access memory and long term storage devices all three such memory or storage devices being denoted schematically by numeral 205 in FIG. 9; and a programmed digital signal processor device for providing communications and graphics capability.

The three dimensional graphics function may be provided by available three dimensional graphics programmes such as Superscape, available from Superscape Ltd, Cromwell House, Bartley Wood House, Business Park, Hook, Hants RG27 8XA, UK. The principles of three dimensional graphics programming are well known and the basics are described in, for example, Personal Computer World July 1992 pages 276–286; August 1992 pages 276–284; September 1992 pages–374–384; and October 1992 pages 404–410, or "Fundamentals of three dimensional computer graphics"; A. H. Watt; Addison Wesley; 1990, or "Principles of interactive computer graphics" (W. M. Newman and R. F. Sproull) McGraw-Hill International (second edition) 1979.

The three dimensional graphics function 201 is arranged to display a view of a predetermined three dimensional artificial space, in which the same common display areas as in the first embodiment are displayed; to navigate around the space under the control of the cursor control device 175b; and to alter the display in accordance with data received via the communications function 176 from the control device 60.

In this embodiment, as well as displaying the common display of a dealing table, other objects in the three dimensional display space are information derived from the maths and statistics function 202, using data from the control device 60, or the information provider gateway 180, or data held in the processor 177.

The security function 203 operates a password lock, to ensure that only an authorised dealer can operate the workstation 170 (in known fashion). The password may be entered by the input device 175, but is preferably entered via the microphone 174, in which case the security section 203 may apply a speaker-dependent word recognition test (as disclosed above in relation to the speech recognition units 92) to determine, firstly, whether the correct password has been given and secondly whether it has been pronounced in a manner characteristic of the predetermined dealer to whom the graphics workstation 170 is allocated.

The audiovisual communications function 204 is arranged to receive input from the microphone 173 and the communications device 176, and to generate output to the loudspeaker 174, the VDU 172 and the communications device 176.

Figure 10A:
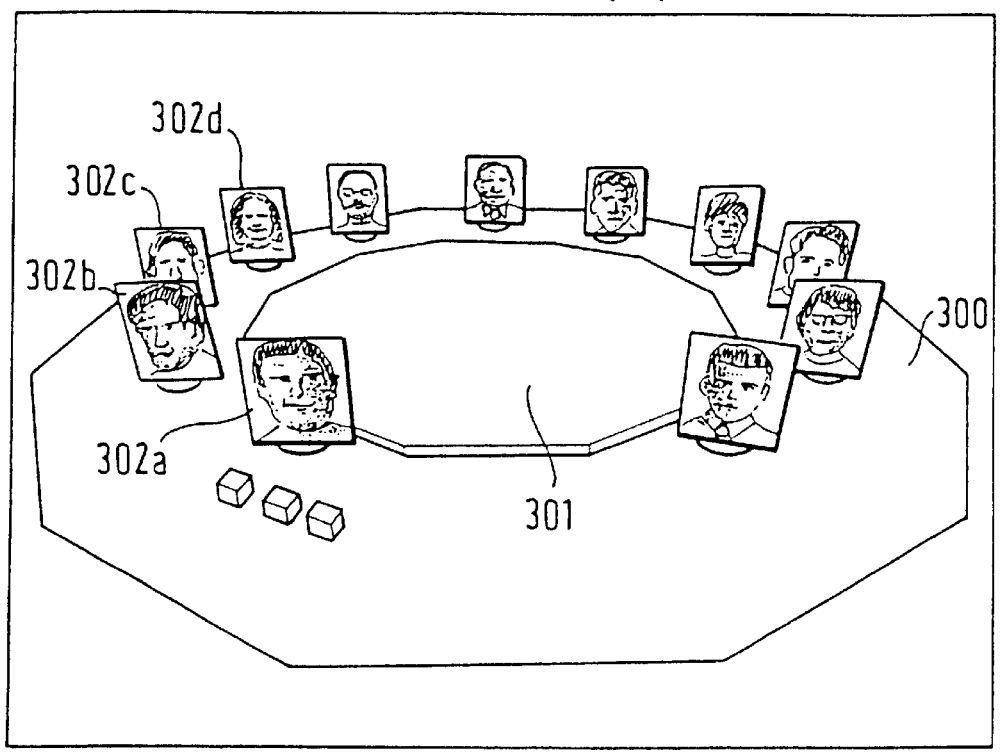
FIGS. 10a–10d are illustrations of displays generated on the workstation of FIG. 9.

Referring to FIG. 10a, a display on the VDU 172 is indicated. The display consists of a representation of a table 300 having a central area 301, surrounded by a plurality of sub images 302a–302d . . . each representing the face of a dealer. The face sub images 302 are distributed evenly around the central area 301, except that there is a gap corresponding to a place for the dealer operating the work station in question.

The table 300, area 301 and sub images 302 form a single dealing room unit, the positions of which are fixed relative to each other in a three dimensional space defined by the 3D graphics Generator 201. By manipulating the cursor control device 175b, the dealer may change his viewpoint relative to the table 300, so as cause the 3D graphics generator 201 to change the display on the VDU 172 to correspond to the different viewpoint.

The system is then arranged to follow the method of operation described above in relation to the first embodiment, except that rather than the control device 60 controlling the display on a common display 20, it signals data to be displayed to the three dimensional graphics generator 201 for display on the VDU 172 of each of the workstations 170a, 170b . . . Rather than the control device 60 determining the pointing device 55 and dealer area 50 pointed at, each workstation 170 is operable to detect the selection by the dealer of another dealer, by detecting the position of the cursor controlled by the position sensitive input device 175b and, when the cursor is coincident with one of the face sub images 302, and a selection button on the pointing device 175b is pressed, the dealer corresponding to the face sub image 302 is signalled as being selected to the control device 60.

To replace the audio visual contact between dealers present in the same room in the first embodiment, in this embodiment a permanent audioconference link may be provided between the dealers via the communications link 171.

Alternatively, when one dealer selects another using his pointing device 175*b*, a selective audioconference link may be established between the selecting and the selected dealer. In each case, the communications interface 176, audiovisual communications function 204, loudspeaker 174 and microphone 173 are employed.

Figure 10B:
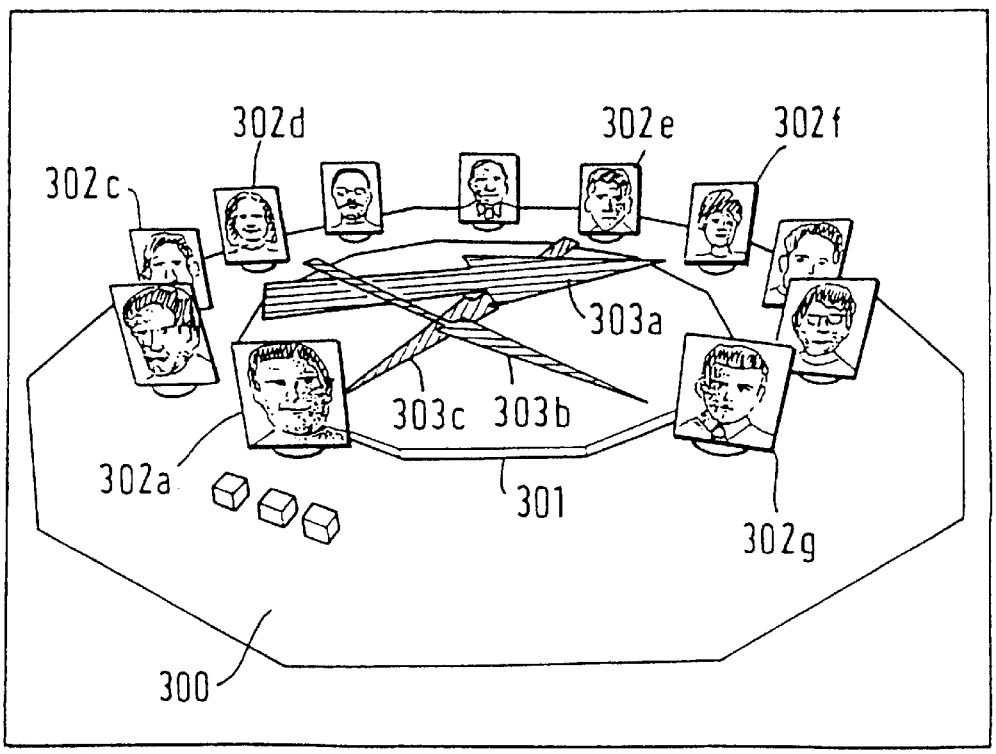

FIG. 10*b* illustrates the display shown on the VDU 172 of one of the workstations, indicating a high value deal in which payment passes from a dealer 302*c* to a dealer 302*f*; a low value deal in which payment passes from a dealer 302*d* to a dealer 302*g*; and a tentative sub deal between a dealer 302*e* and a dealer 302*a*; indicated, respectively, by arrows 303*a*, 303*b* and 303*c*.

Figure 10C:
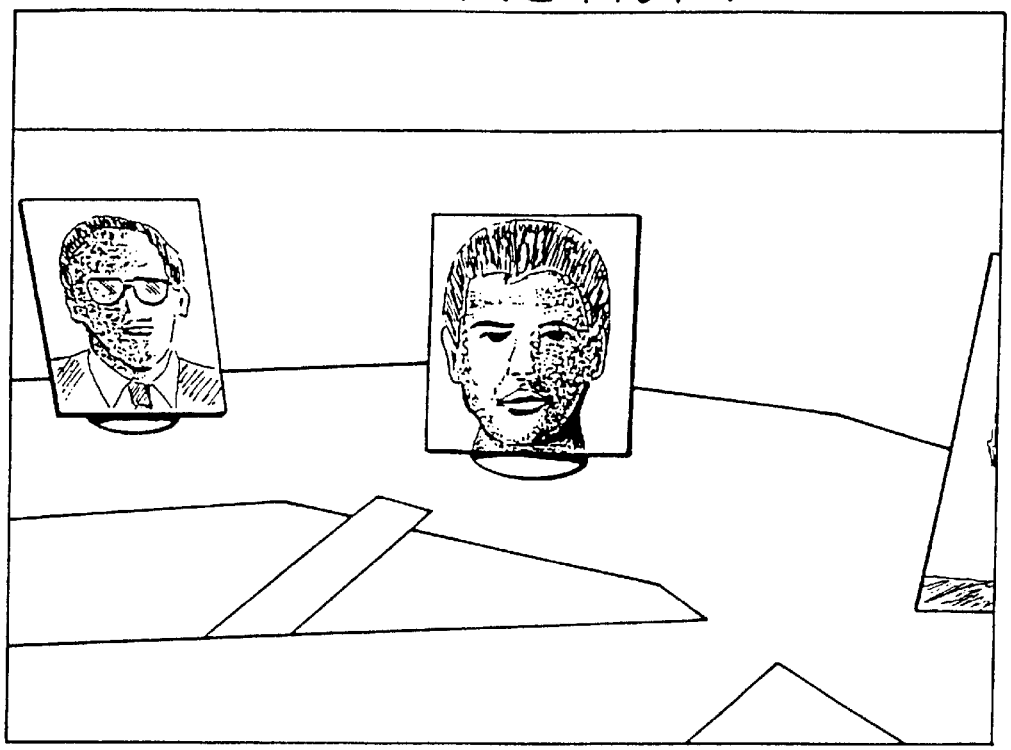

In this embodiment, on selection of another dealer as described above, the 3D graphics generator 201 is preferably arranged to change the display on the VDU 172 to a closer view as shown in FIG. 10*c*. This is preferably performed by causing the 3D graphics generator 201 to progressively move the viewpoint closer to the face sub image 302 of the selected dealer, so as to provide an animated display in which the screen appears to travel towards the selected dealer. Preferably, the resolution with which the facial sub image is displayed is progressively increased as it occupies a progressively larger area of the VDU 172.

Figure 10D:
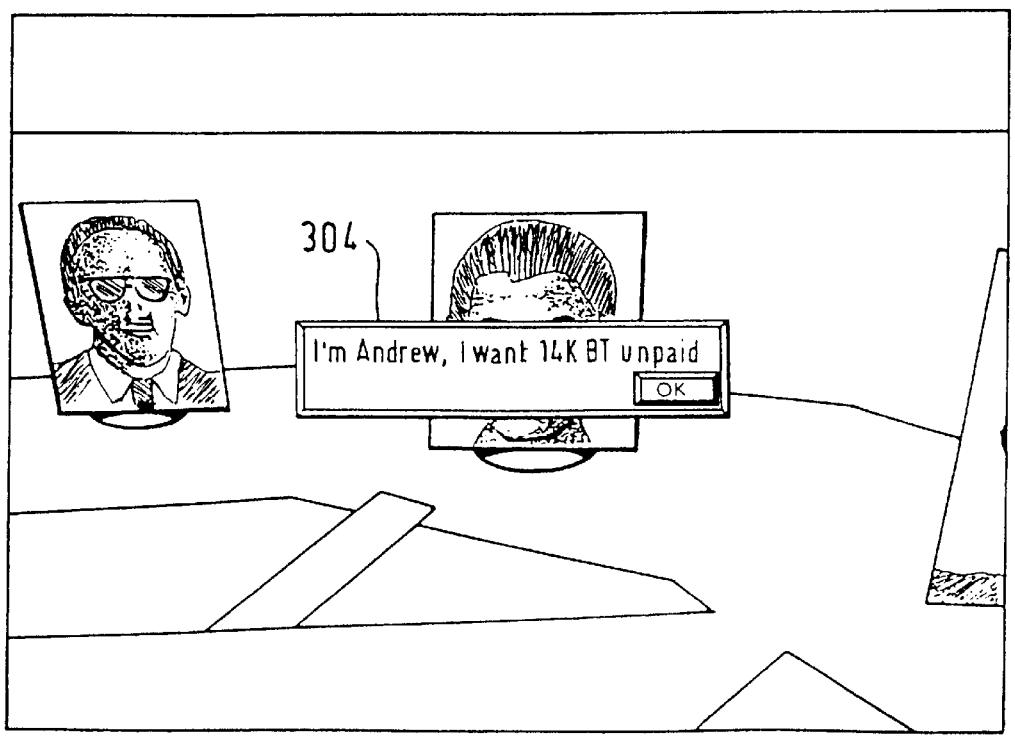

As shown in FIG. 10*d*, the control device 60 is arranged in this embodiment to display such data as is held in the deal record 100 at the facial sub image 302 in the form of a data window 304 (in this case containing the words "I'm Andrew. I want 14K BT unpaid"); thus indicating the dealer's name field 101 ("Andrew"); transaction type ("want"); commodity ("BT unpaid"); and volume ("14K").

In this embodiment this is additional to the voice communication between the two dealers, but in other embodiments, all communication may be purely textual.

In this embodiment, to increase interaction, the facial display 304 of a selected dealer may be animated to provide a low bit rate videotelephone link, as disclosed for example in EP-A-0225729 (incorporated herein by reference).

The elements 300–303 of the display described are commonly shown on all the workstations 170, so that as in the first embodiment there is a common display of the ongoing status of deals visible to all dealers.

On the other hand, the view point of the display area is under the local control of each dealer, so that the common display elements may appear from different viewpoints at different terminals 170. In particular, where one dealer has selected another for the purpose of creating a tentative deal, the contacting dealer will uniquely have the "close-up" view of FIGS. 10*c* and 10*d*, with visibility of the data display window 304.

Figure 11:
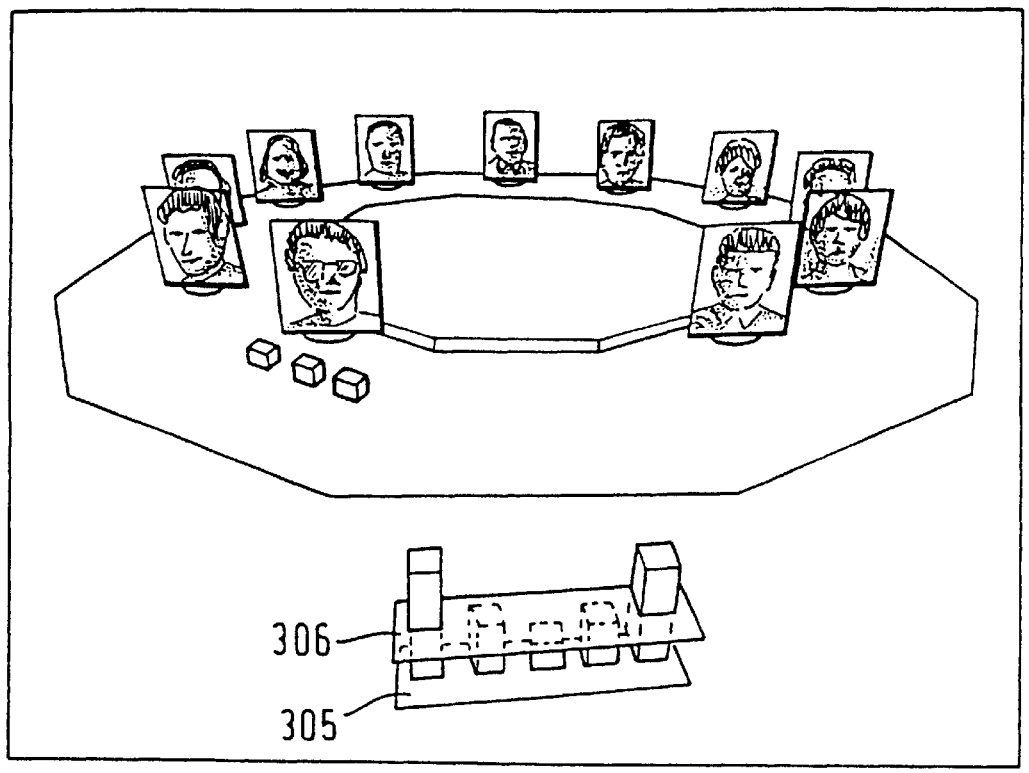
FIGS. 11 and 12 are further displays generated on the workstation of FIG. 9.

The common display area is, in this embodiment, supplemented by additional data which may be displayed only on one or selected ones of the dealer graphic workstations 171. Referring to FIG. 11, in this embodiment, the area in the three dimensional representation space beneath the common display table 300 is used as a private display area, in which data from the mathematics and statistics processor 202 is displayed in three dimensional form 205, consisting in this embodiment of a three dimensional bar chart with a threshold plane 306 to provide the dealer with a visually convenient representation of a decision point.

The data displayed in the bar chart representation 305 may, for example, relate to securities price data received by the graphics workstation 171 from the financial information provider gateway 180, or from other sources. The bar chart display 305 is continually updated as new data is received via the communications link 171 from the gateway 180 (or elsewhere). Thus, the dealer is able to judge when predetermined criteria are met by observing when the bars of the bar chart pass the predetermined display plane 306, and to initiate dealing at that time (for example, on achieving a certain price level for a commodity on other international markets).

Figure 12:
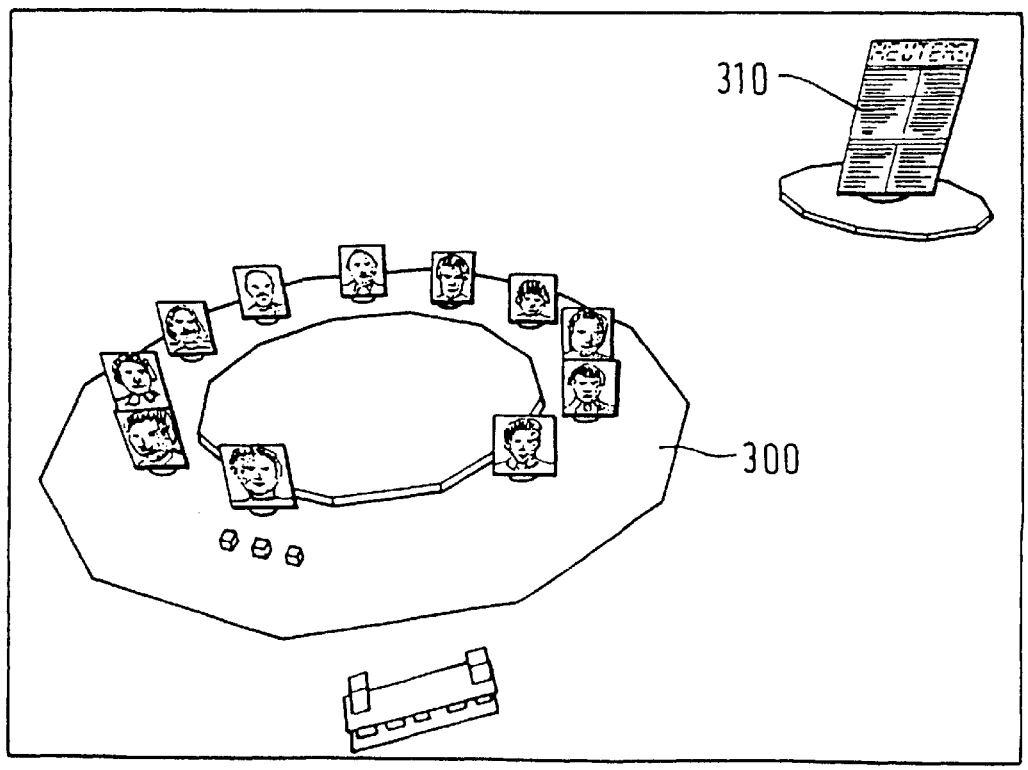

Referring to FIG. 12, the information provider gateway 180 may be represented by another three dimensional display 310 in the display space containing the table 300. This representation is convenient, in that the dealer can (by manipulation of the pointing device 175*b*) move the screen viewpoint towards the information provider representation 310 without losing sight of the representation of the table 300 and vice versa.

In this embodiment, a graphical workstation 171 may be in communication with a plurality of different control devices 60 defining different "virtual dealing rooms" (i.e. different groups of dealers). In this case, conveniently, each is represented by a different three dimensional representation of a dealing table, as disclosed above, and the dealer may select between the different tables by manipulating his pointing device 175*b* to navigate his viewpoint towards a desired representation.

When a dealer wishes to join a virtual dealing room (group of dealers) initially, data defining his identity (and including a representation of his face) is transmitted to the control device 60 via the communications link, from whence it is re-distributed to each of the graphics workstations 171 participating in the virtual dealing room, upon which each three dimensional graphics processor 201 adds the new facial sub image 302 to the display shown on the VDU 172. In like fashion, a dealer may withdraw from the virtual dealing room, causing his facial sub image 302 to be deleted from the screens to the workstations of other dealers.

Thus, this embodiment provides a virtual dealing room within which elements of human-to-human interaction are retained by the steps of:
1. Displaying a common graphical representation of the participants, in which the deals in progress are visible to all participants;
2. Retaining visual images of the personnel;
3. Maintaining the possibility of audio and/or video conferencing; and
4. At the same time, providing for the display of private data not available to other dealers at each workstation.

Naturally, these improvements may be used separately of each other, and separately of various aspects of the first embodiment. Although a central control device 60 has been described, it would equally be possible for the same functions to be performed by one of the workstations, or by all the workstations operating in a distributed processing fashion. Although a wide area network has been described, it would of course be possible to operate through a local area network, or via the Internet for example.

Rather than providing central voice recognition and voice storage units as in the first embodiment, voice recognition and voice storage may be provided at each of the workstations 171.

Third Embodiment

In a third embodiment of the invention, communication is further improved relative to the first embodiment by the provision of improved handsets. The handsets of the third embodiment are usable independently of the first embodiment, and for applications other than dealing transactions.

Figure 13:
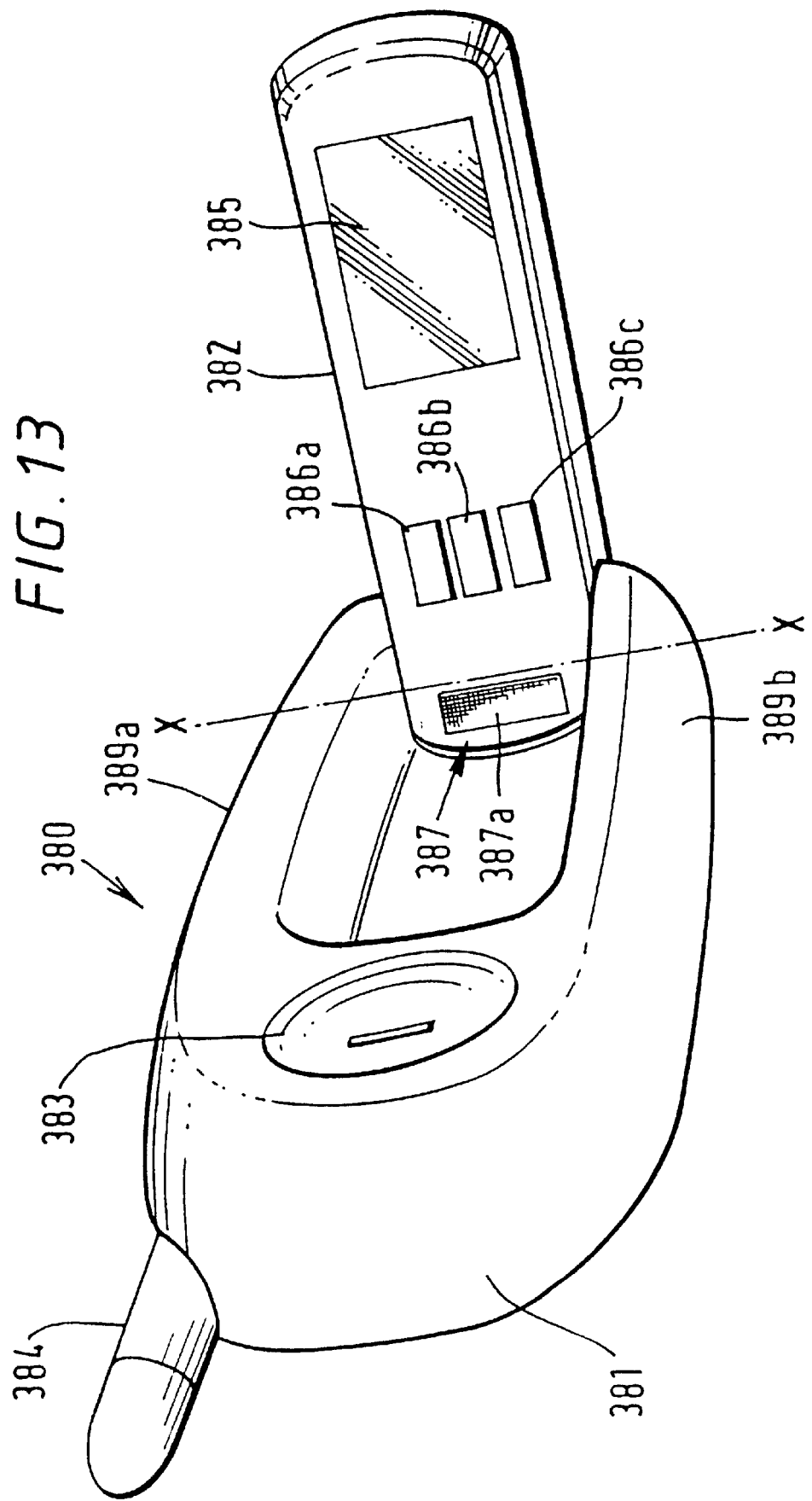
Figure 14:
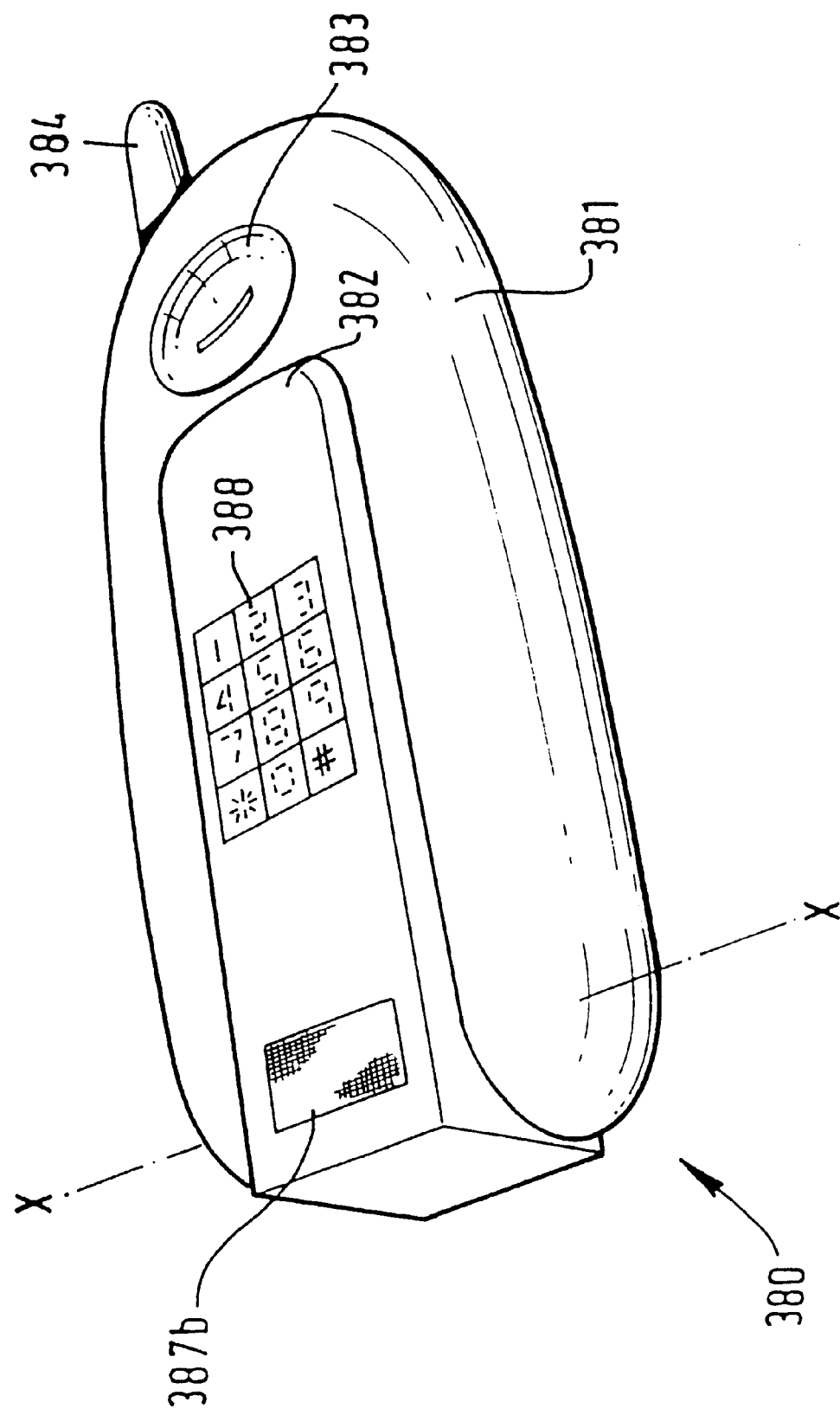
FIG. 14 is a perspective view of the handset of FIG. 13 in a closed position.

Referring to FIGS. 13 and 14, in this embodiment the telephone 80 and dealer terminals 70 of the first embodiment are replaced by a cordless telephone 380 which includes a visual display. In greater detail, the handset 380 comprises an earpiece portion 381 and a display portion 382. The earpiece portion includes a loudspeaker 383 which is arranged to be positioned next to the ear of the operator to couple sound thereto. It also mounts an antenna 384 for RF communication.

The display portion carries a visual display 385, and display controls 386a–386c for, respectively, contrast; brightness; and colour. Also provided is a microphone 387 which, in this case, comprises a pair of microphones 387a, 387b mounted on opposite faces of the display portion for reasons which will be discussed below. Finally, the display portion carries a keypad 388 on the other face thereof to the display 385.

The display portion 382 is hingedly connected to the earpiece portion 381 so as to be moveable between the open, or use, position of FIG. 13 and the closed, or non use, position of FIG. 14. The earpiece portion comprises a yoke consisting of a pair of arms 389a, 389b, to which the display portion 382 is hinged at a pair of hinge points 388a, 388b (not shown,) so as to pivot about the axis X—X.

Figure 15:
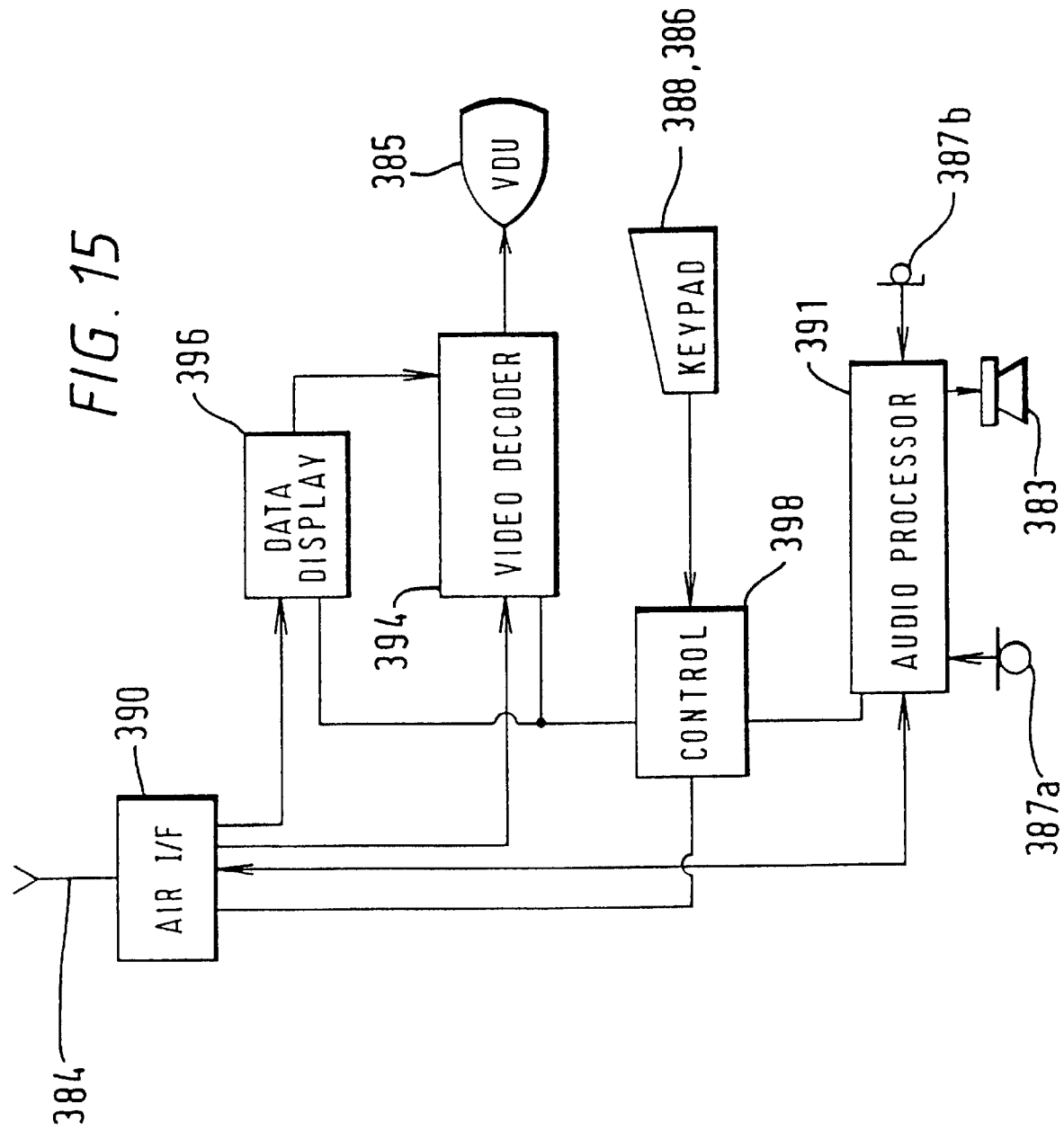
FIG. 15 is a block diagram showing the internal components of the handset of FIGS. 13 and 14.

Referring to FIG. 15, the handset 360 comprises an air interface comprising the antenna 384 and RF transceiver 390 (comprising convention modulator/demodulator components); an audio processing circuit 391 comprising, for example a GSM digital cellular chip set, to which are connected the loudspeaker 383 and microphones 387a, 387b; a video decoder 394 (such as an H261 or H320 videophone chip set) connected to supply a video driving signal to the display 385; and a data display circuit 396 (comprising for example a microcontroller) arranged to receive data and to generate a bar chart or like graphical display of the data on the screen 385. Controlling the operation of the handset is a control circuit 398, which is arranged to receive input from the keypad 388.

Conveniently, the display 385 is a thin film transistor (TFT) colour liquid crystal display or the like.

In operation, the handset is held so that the display 385 is visible to the dealer whilst the earpiece is adjacent to his ear; it may be held with the display 385 directly in front of the dealers eyes in the manner of a head-up display, but it will more usually be held at a lower angle so as to provide visibility above the display portion 382.

In operation, the audio circuit 382 functions as a convention digital cellular telephone. The presence of two microphones 387a, 387b permits, in this embodiment, the use of noise cancellation processing, in which the signal from one microphone is used to estimate background noise to process the signal from the other.

Additionally, however, the handset is arranged to receive a low bit rate videophone signal to be decoded by the video decoder 394 and displayed on the display 385. The video bitstream may be used to conduct video telephony, but in this embodiment, it is employed to receive a signal which includes a display of share price or like commodity data from the local switching centre (which in this case is a wireless PABX) Additionally, the data display device 396 is programmed to display particular pre-formatted data displays (such as bar charts, pie charts or the like) representing particular commodity prices or other quantitative data, and to receive updated data from the area interface 390 to modify the display. This permits the use of a lower bandwidth connection than the use of a video decoder 394.

Different displays may be selected (and other aspects of the operation of the phone may be controlled) by either:

1. Providing that the screen 385 is touch sensitive, and providing displayed "soft buttons" to which the control unit 398 is responsive to modify the displayed data by control of the data display circuit 396 and/or video decoder 394;
2. The control circuit 398 may include a voice recognition unit, by which the display may be controlled; or
3. The keypad 388 may be manipulated to switch between displays (for example, in accordance with many options displayed in a portion of the display 385).

It will be clear that the handset according to this embodiment advantageously improves the operation of the first embodiment in the following respect:

1. Because it is cordless, it permits the dealer greater freedom in negotiating whilst initiating communication with his client or other called parties.
2. Because it includes a data display, it enables the dealer to constantly review changing data such as commodity prices whilst negotiating, without having to look down at a screen.
3. Finally, because the display is close to the dealers eyes, greater privacy and security is provided if the dealer wishes to view private information.

It will be clear from the foregoing that various amendments or substitutions may be made to the above described embodiment.

For example, whilst operation with a radio air interface has been described, the aerial 384 and air interface circuit 390 could be replaced by an infrared signalling circuit comprising an optoelectrical and electrooptical transceiver (e.g. a photodiode and photoelectric cell) communicating at, for example, infrared wavelengths.

This may be preferable under some circumstances in providing a higher degree of security against interception from outside the dealing room, and in providing the potential for a wider bandwidth.

In this case, a separate infrared communications circuit may be provided on the ceiling of the dealing room, or the display generator could additionally project the signals or communication to the handsets 380.

Whilst operation as a digital cellular telephone has been mentioned, other personal communication technology such as the DECT or CT2 cordless telephone standards could be employed, in which case the audio circuit 392 comprises the appropriate chip set.

Whilst the handset has been described as including both a data display circuit 396 for receiving data (e.g. in the form of datagram traffic) and generating therefrom a video display, and a video decoder circuit 394 for receiving a low bit rate video signal and generating an appropriate display, it will be clear that one or other of these could be omitted in this or other applications.

Naturally, other physical arrangements than those described herein could be employed for mounting the display portion 382 to the earpiece portion 381, and they could be provided in a fixed mounting, but it is preferred to provide a pivoting or folding mounting as illustrated in FIGS. 13 and 14, since this provides additional protection to the display 385 when it is not in use and reduces the overall dimensions of the handset.

In modifications of the above embodiment, it may be possible to use the handset as a conventional cordless telephone when it is in the folded position of FIG. 14.

The handset 380 may include speech recognition and voice storage devices, thus obviating the need to provide these centrally, as discussed above in relation to the first embodiment.

The display 385 may be arranged to generate a stereo appearance; this is particularly possible since the display will normally be in a fixed physical relationship to the eyes of the user.

Many other aspects and embodiments of the invention will be apparent to the skilled person from the foregoing. Accordingly, the present invention is not intended to be limited to the above described embodiments but to extend to all modifications thereof which will be apparent to the skilled reader. Protection is sought for any and all novel subject matter and combinations of such subject matter disclosed herein.

What is claimed is:

1. A transaction support apparatus for use by one or more human transaction operators, each provided with a telephone, which apparatus comprises:
   a speech recognition device having:
      a speech input coupled to receive a speech signal input to a said telephone by a human transaction operator,
      a speech recognition processor arranged to recognize predetermined transaction parameters within said speech signal; and
   a parameter output at which said speech recognition device is arranged to make values of said parameters thus recognized available.

2. Apparatus as in claim 1, which further comprises:
   speaker verification apparatus coupled to receive a speech signal from a said telephone and to verify that said speech signal originates from a genuine said human transaction operator.

3. Apparatus as in claim 1 which further comprises:
   a confirmatory output device coupled to said parameter output, to generate a confirmatory indication, recognizable by a said human transaction operator, of values of said parameters thus recognized.

4. Apparatus as in claim 3, which further comprises:
   a confirmation input means for receiving, from said human transaction operator, a signal accepting or rejecting said confirmatory indication.

5. Apparatus as in claim 4, in which said confirmation input means is provided by said speech recognition device.

6. Apparatus as in claim 3, in which said confirmatory output device comprises:
   a speech synthesizer arranged to generate, from said parameter output values, a corresponding synthetic speech signal reciting said values.

7. Apparatus as in claim 6, in which said speech synthesizer is coupled to said telephone to supply said synthetic speech signal to said human transaction operator via said telephone.

8. Apparatus as in claim 3 in which said confirmatory output device comprises a visual display.

9. A method of operating a transaction support apparatus for use by one or more transaction operators, the support apparatus comprising an electronic speech recognition device, said method comprising:
   coupling the electronic speech recognition device to receive a speech signal including a confirmatory dialogue from a transaction operator to another party;
   recognizing values of parameters of the transaction within the speech of the transaction operator utilizing said electronic speech recognizer; and
   supplying data recording the results of said recognition in electronic form from said electronic speech recognizing unit to an electronic transaction recording computer.

10. The method of claim 9 further comprising the step of: operating said electronic speech recognizer to recognize whether the speech corresponds to a predetermined human transaction operator.

11. The method of claim 9 further comprising the step of:
   outputting a confirmatory output indication, recognizable by a said human transaction operator, of values of said parameters thus recognized.

12. The method of claim 11, further comprising the step of:
   accepting, from said human transaction operation, a signal accepting or rejecting said confirmatory indication.

13. The method of claim 12, in which the step of accepting comprises the step of:
   operating the electronic speech recognition device to recognize confirmation or rejection.

14. The method of claim 12 in which:
   said recognized parameter values are not passed on to said computer until a signal is accepted which indicates acceptance of said confirmatory indication.

15. The method of claim 11, in which said step of generating a confirmatory indication comprises:
   operating an electronic speech synthesizer device to generate a corresponding synthetic speech signal.

16. The method of claim 15, in which said electronic speech synthesizer is coupled to said telephone to supply said synthetic speech signal via said telephone.

17. The method of claim 11, in which said step of generating a confirmatory output comprises:
   generating a visual signal on a visual display unit.

18. A transaction support apparatus for use by a plurality of human transaction operators, each provided with a telephone, which apparatus comprises:
   a speech recognition device having:
      a speech input coupled to receive a speech signal input to a said telephone by a human transaction operator which is confirmatory of a transaction,
      a speech recognition processor arranged to recognize predetermined transaction parameters within said speech signal; and
      a parameter output at which said speech recognition device is arranged to make values of said parameters thus recognized available; and
   an electronic transaction recording means for recording the results of said recognition together with at least portions of the received speech signal.

19. Apparatus as in claim 18 which further comprises;
   speaker verification apparatus coupled to receive a speech signal from a said telephone and to verify that said speech signal originates from a genuine said human transaction operator.

20. Apparatus as in claim 18 which further comprises:
   a confirmatory output device coupled to said parameter output, to generate a confirmatory indication, recognizable by a said human transaction operator, of values of said parameters thus recognized.

21. Apparatus as in claim 20 which further comprises:
   a confirmation input means for receiving, from said human transaction operator, a signal accepting or rejecting said confirmatory indication.

22. Apparatus as in claim 21 in which said confirmation input means is provided by said speech recognition device.

23. Apparatus as in claim 20 in which said confirmatory output device comprises:
   a speech synthesizer arranged to generator, from said parameter output values, a corresponding synthetic speech signal reciting said values.

24. Apparatus as in claim 23 in which said speech synthesizer is coupled to said telephone to supply said synthetic speech signal to said human transaction operator via said telephone.

25. Apparatus as in claim 20 in which said confirmatory output device comprises a visual display.

26. A method of operating a transaction support apparatus for use by one or more transaction operators, the support apparatus comprising an electronic speech recognition device, said method comprising:

coupling the electronic speech recognition device to receive a speech signal including a confirmatory dialogue from a transaction operator to another party;

recognizing values of parameters of the transaction within the speech of the transaction operator utilizing said electronic speech recognizer; and supplying data recording the results of said recognition in electronic form from said electronic speech recognizing unit to an electronic transaction recording computer together with at least a portion of said received speech signal.

27. The method of claim 26 further comprising the step of:

operating an electronic speaker recognizer to recognize whether the speech corresponds to a predetermined human transaction operator.

28. The method of claim 26 further comprising the step of:

generating a confirmatory output indication, recognizable by a said human transaction operator, of values of said parameters thus recognized.

29. The method of claim 28 further comprising the step of:

accepting, from said human transaction operation, a signal accepting or rejecting said confirmatory indication.

30. The method of claim 29 in which the step of accepting comprises the step of:

operating the electronic speech recognition device to recognize confirmation or rejection.

31. The method of claim 29 in which:

said recognized parameter values are not passed on to said computer until a signal is accepted which indicates acceptance of said confirmatory indication.

32. The method of claim 28 in which said step of generating a confirmatory indication comprises:

operating an electronic speech synthesizer device to generate a corresponding synthetic speech signal.

33. The method of claim 32 in which said electronic speech synthesizer is coupled to said telephone to supply said synthetic speech signal via said telephone.

34. The method of claim 28 in which said step of generating a confirmatory output comprises:

generating a visual signal on a visual display unit.

* * * * *